US012691683B2

(12) United States Patent
Sugahara et al.

(10) Patent No.: US 12,691,683 B2
(45) Date of Patent: Jul. 28, 2026

(54) INK-JET HEAD AND INK-JET PRINTER

(71) Applicant: BROTHER KOGYO KABUSHIKI KAISHA, Nagoya (JP)

(72) Inventors: Hiroto Sugahara, Ama (JP); Fumika Hatta, Kuwana (JP); Itsuki Morimoto, Inazawa (JP); Toru Yamashita, Nagoya (JP); Etsuteru Inoue, Obu (JP); Hirotoshi Ishizaki, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 148 days.

(21) Appl. No.: 18/611,025

(22) Filed: Mar. 20, 2024

(65) Prior Publication Data

US 2024/0316926 A1 Sep. 26, 2024

(30) Foreign Application Priority Data

Mar. 23, 2023 (JP) ................................ 2023-046866

(51) Int. Cl.
*B41J 2/14* (2006.01)
*B41J 2/175* (2006.01)

(52) U.S. Cl.
CPC ........... *B41J 2/14201* (2013.01); *B41J 2/175* (2013.01); *B41J 2002/14306* (2013.01); *B41J 2002/14491* (2013.01)

(58) Field of Classification Search
CPC ...... B41J 2/14; B41J 2/14032; B41J 2/14072; B41J 2/1408; B41J 2/14145; B41J 2/14201; B41J 2/1433; B41J 2002/14306; B41J 2002/14419
See application file for complete search history.

(56) References Cited

U.S. PATENT DOCUMENTS

| | | | | |
|---|---|---|---|---|
| 2011/0242214 | A1* | 10/2011 | Kura | B41J 2/055 347/44 |
| 2019/0193399 | A1* | 6/2019 | Shimosato | B41J 2/14209 |
| 2021/0300037 | A1* | 9/2021 | Ishizaki | B41J 2/14233 |
| 2021/0354467 | A1 | 11/2021 | Zhang et al. | |

FOREIGN PATENT DOCUMENTS

| | | | | |
|---|---|---|---|---|
| JP | 2018-34474 | A | | 3/2018 |
| JP | 2018034474 | A | * | 3/2018 |
| JP | 2022-134245 | A | | 9/2022 |

OTHER PUBLICATIONS

Hatta, MachineTranslationofJP-2018034474-A, 2018 (Year: 2018).*
Extended European Search Report for European Patent Application No. 24162542.5 (Aug. 13, 2024).

* cited by examiner

*Primary Examiner* — Scott A Richmond
(74) *Attorney, Agent, or Firm* — Kenealy Vaidya LLP

(57) ABSTRACT

An ink-jet head includes a flow passage member formed with: a first common flow passage; a first ink supply port; first individual flow passages; a second common flow passage; a second ink supply port; and second individual flow passages, first pressure generators, second pressure generators, a first conductive part, and a second conductive part. The first ink supply port is positioned on one side in the first direction, the second ink supply port is positioned on the other side in the first direction, an end portion of the first conductive part positioned nearer to a control circuit is positioned on the other side in the first direction, and an end portion of the second conductive part positioned nearer to the control circuit is positioned on the one side in the first direction.

12 Claims, 9 Drawing Sheets

INK-JET HEAD AND INK-JET PRINTER

REFERENCE TO RELATED APPLICATIONS

This application claims priority from Japanese Patent Application No. 2023-046866 filed on Mar. 23, 2023. The entire content of the priority application is incorporated herein by reference.

BACKGROUND ART

Conventionally, an ink-jet head is known, which is provided with a flow passage unit and a piezoelectric actuator.

The flow passage unit is formed with a first nozzle row, a first manifold, a first ink supply port, a second nozzle row, a second manifold, and a second ink supply port. Each of the first nozzle row and the second nozzle row is formed by a plurality of nozzles which are aligned in a predetermined direction. The first manifold extends in the predetermined direction, and the first manifold is communicated with the plurality of nozzles which form the first nozzle row. The second manifold extends in the predetermined direction, and the second manifold is communicated with the plurality of nozzles which form the second nozzle row. The first ink supply port is communicated with the first manifold on one side in the predetermined direction with respect to the first nozzle row. The second ink supply port is communicated with the second manifold on one side in the predetermined direction with respect to the second nozzle row.

The piezoelectric actuator is provided with a plurality of first piezoelectric elements which correspond to the plurality of nozzles for forming the first nozzle row respectively, and a plurality of second piezoelectric elements which correspond to the plurality of nozzles for forming the second nozzle row respectively. The plurality of first piezoelectric elements are provided with a plurality of first common electrodes which are aligned in the predetermined direction. The plurality of first common electrodes are connected to a control substrate via a first connecting portion which extends in the predetermined direction. The plurality of second piezoelectric elements are provided with a plurality of second common electrodes which are aligned in the predetermined direction. The plurality of second common electrodes are connected to the control substrate via a second connecting portion which extends in the predetermined direction. Then, an end portion of the first connecting portion positioned on the side of the control substrate is positioned on one side in the predetermined direction with respect to the plurality of first piezoelectric elements, and an end portion of the second connecting portion positioned on the side of the control substrate is positioned on the other side in the predetermined direction with respect to the plurality of second piezoelectric elements.

SUMMARY

In the ink-jet head constructed as described above, the ink, which flows into the first manifold from the first ink supply port, flows from one side to the other side in the predetermined direction through the first manifold. Further, the ink, which flows into the second manifold from the second ink supply port, also flows from one side to the other side in the predetermined direction through the second manifold. On this account, the heat, which is generated in the plurality of first piezoelectric elements, has the influence on the ink contained in the first manifold, the influence being increased in the direction directed to the other side in the predetermined direction. In other words, when attention is focused on the influence of the heat generated in the plurality of first piezoelectric elements, the temperature of the ink contained in the first manifold is raised in the direction directed to the other side in the predetermined direction. Similarly, the heat, which is generated in the plurality of second piezoelectric elements, has the influence on the ink contained in the second manifold, the influence being increased in the direction directed to the other side in the predetermined direction as well. In other words, when attention is focused on the influence of the heat generated in the plurality of second piezoelectric elements, the temperature of the ink contained in the second manifold is raised in the direction directed to the other side in the predetermined direction.

On the other hand, in relation to the first connecting portion provided to connect the plurality of first common electrodes to the control substrate, the amount of movement of the electric charge is more increased at positions nearer to the end portion arranged on the side of the control substrate. On this account, in the case of the first connecting portion, the amount of heat generation is more increased at positions nearer to the end portion arranged on the side of the control substrate. In relation thereto, the end portion of the first connecting portion positioned on the side of the control substrate is positioned on one side in the predetermined direction. On this account, when attention is focused on the influence of the heat generation at the first connecting portion, the temperature of the ink contained in the first manifold is raised in the direction directed to one side in the predetermined direction. Similarly, also in relation to the second connecting portion provided to connect the plurality of second common electrodes to the control substrate, the amount of movement of the electric charge is more increased at positions nearer to the end portion arranged on the side of the control substrate. On this account, in the case of the second connecting portion, the amount of heat generation is more increased at positions nearer to the end portion arranged on the side of the control substrate. In relation thereto, the end portion of the second connecting portion positioned on the side of the control substrate is positioned on the other side in the predetermined direction. On this account, when attention is focused on the influence of the heat generation at the second connecting portion, the temperature of the ink contained in the second manifold is raised in the direction directed to the other side in the predetermined direction.

According to the above, the temperature of the ink contained in the first manifold tends to be constant in the predetermined direction on account of the influence of the heat generated in the plurality of first piezoelectric elements and the influence of the heat generation brought about in the first connecting portion. On this account, the viscosity of the ink contained in the first manifold tends to be constant in the predetermined direction, and the volume of the ink droplet ejected from the plurality of nozzles for forming the first nozzle row tends to be constant. On the contrary, the temperature of the ink contained in the second manifold is raised in the direction directed to the other side in the predetermined direction on account of the influence of the heat generated in the plurality of second piezoelectric elements and the influence of the heat generation brought about in the second connecting portion. On this account, the viscosity of the ink contained in the second manifold is consequently lowered in the direction directed to the other side in the predetermined direction, and thus the volume of the ink droplet ejected from the plurality of nozzles for forming the second nozzle row is increased in the direction directed to the other side in the predetermined direction. As a result, an image, which is printed by the ink-jet head constructed as described above, involves such a problem that any uneven density arises thereon.

The present teaching has been made in order to solve the problem as described above, an object of which is to provide an ink-jet head which can suppress the uneven density by mitigating the influence of heat generation caused by a pressure generator such as a piezoelectric element or the like and the influence of heat generation caused by a conductive part connected to the pressure generator, and an ink-jet printer which is provided with the ink-jet head.

According to a first aspect of the present teaching, there is provided an ink-jet head including: a flow passage member including: a first common flow passage extending in a first direction; a first ink supply port communicated with the first common flow passage; a plurality of first individual flow passages each connected to the first common flow passage and aligned in the first direction; a second common flow passage extending in the first direction and positioned to be deviated from the first common flow passage in a second direction orthogonal to the first direction; a second ink supply port communicated with the second common flow passage; and a plurality of second individual flow passages each connected to the second common flow passage and aligned in the first direction; a plurality of first pressure generators aligned in the first direction and configured to generate pressure to ink contained in the first individual flow passages; a plurality of second pressure generators aligned in the first direction and configured to generate pressure to the ink contained in the second individual flow passages; a first conductive part configured to electrically connect the first pressure generators to a control circuit; and a second conductive part configured to electrically connect the second pressure generators to the control circuit. The first ink supply port is positioned on one side in the first direction with respect to the first individual flow passages, and the second ink supply port is positioned on the other side in the first direction with respect to the second individual flow passages, and an end portion of the first conductive part positioned nearer to the control circuit is positioned on the one side in the first direction with respect to the first pressure generators and an end portion of the second conductive part positioned nearer to the control circuit is positioned on the other side in the first direction with respect to the second pressure generators, or the end portion of the first conductive part positioned nearer to the control circuit is positioned on the other side in the first direction with respect to the first pressure generators and the end portion of the second conductive part positioned nearer to the control circuit is positioned on the one side in the first direction with respect to the second pressure generators.

In the ink-jet head according to the first aspect of the present teaching, the first ink supply port is positioned on the one side in the first direction with respect to the plurality of first individual flow passages, and the second ink supply port is positioned on the other side in the first direction with respect to the plurality of second individual flow passages. On this account, when attention is focused on the influence of the heat generation brought about by the plurality of first pressure generators, the temperature of the ink contained in the first common flow passage is raised in the direction directed to the other side in the first direction. On the other hand, when attention is focused on the influence of the heat generation brought about by the plurality of second pressure generators, the temperature of the ink contained in the second common flow passage is raised in the direction directed to the one side in the first direction.

In relation thereto, when the end portion of the first conductive part positioned nearer to the control circuit is positioned on the one side in the first direction, and the end portion of the second conductive part positioned nearer to the control circuit is positioned on the other side in the first direction, then the temperature of the ink contained in the first common flow passage is raised in the direction directed to the one side in the first direction on account of the influence of the heat generation brought about by the first conductive part. On the other hand, the temperature of the ink contained in the second common flow passage is raised in the direction directed to the other side in the first direction on account of the influence of the heat generation brought about by the second conductive part. In other words, on account of the influences of the heat generation brought about by the plurality of first pressure generators and the heat generation brought about by the first conductive part, the temperature of the ink contained in the first common flow passage tends to be constant in the first direction. Similarly, on account of the influences of the heat generation brought about by the plurality of second pressure generators and the heat generation brought about by the second conductive part, the temperature of the ink contained in the second common flow passage also tends to be constant in the first direction. As a result, it is possible to suppress the uneven density on the image printed by the ink-jet head according to the first aspect.

Further, when the end portion of the first conductive part positioned nearer to the control circuit is positioned on the other side in the first direction, and the end portion of the second conductive part positioned nearer to the control circuit is positioned on the one side in the first direction, then the temperature of the ink contained in the first common flow passage is raised in the direction directed to the other side in the first direction on account of the influence of the heat generation brought about by the first conductive part. On the other hand, the temperature of the ink contained in the second common flow passage is raised in the direction directed to the one side in the first direction on account of the influence of the heat generation brought about by the second conductive part. In other words, on account of the influences of the heat generation brought about by the plurality of first pressure generators and the heat generation brought about by the first conductive part, the temperature of the ink contained in the first common flow passage is raised in the direction directed to the other side in the first direction. On the contrary, on account of the influences of the heat generation brought about by the plurality of second pressure generators and the heat generation brought about by the second conductive part, the temperature of the ink contained in the second common flow passage is raised in the direction directed to the one side in the first direction. In other words, the temperature gradient in the first direction of the ink contained in the first common flow passage is reverse to or opposite to the temperature gradient in the first direction of the ink contained in the second common flow passage. On this account, the volume of the ink droplet ejected from the plurality of first individual flow passages is increased in the direction directed to the other side in the first direction, while the volume of the ink droplet ejected from the plurality of second individual flow passages is increased in the direction directed to the one side in the first direction. Then, the plurality of first individual flow passages and the plurality of second individual flow passages are aligned in the second direction. As a result, it is possible to suppress the uneven density on the image printed by the ink-jet head according to the first aspect.

According to a second aspect of the present teaching, there is provided an ink-jet printer including: the ink-jet head according to the first aspect; and an ink supply unit which is constructed to supply the ink to the ink-jet head. The first ink supply port and the second ink supply port are communicated with the ink supply unit.

According to the ink-jet printer according to the second aspect of the present teaching, it is possible to obtain the effect which is the same as or equivalent to that of the ink-jet head according to the first aspect.

According to the present teaching, it is possible to provide the ink-jet head which can suppress the uneven density by mitigating the influence of heat generation caused by the pressure generator and the influence of heat generation caused by the conductive part connected to the pressure generator, and the ink-jet printer which is provided with the ink-jet head.

DESCRIPTION

First Embodiment

Figure 1:
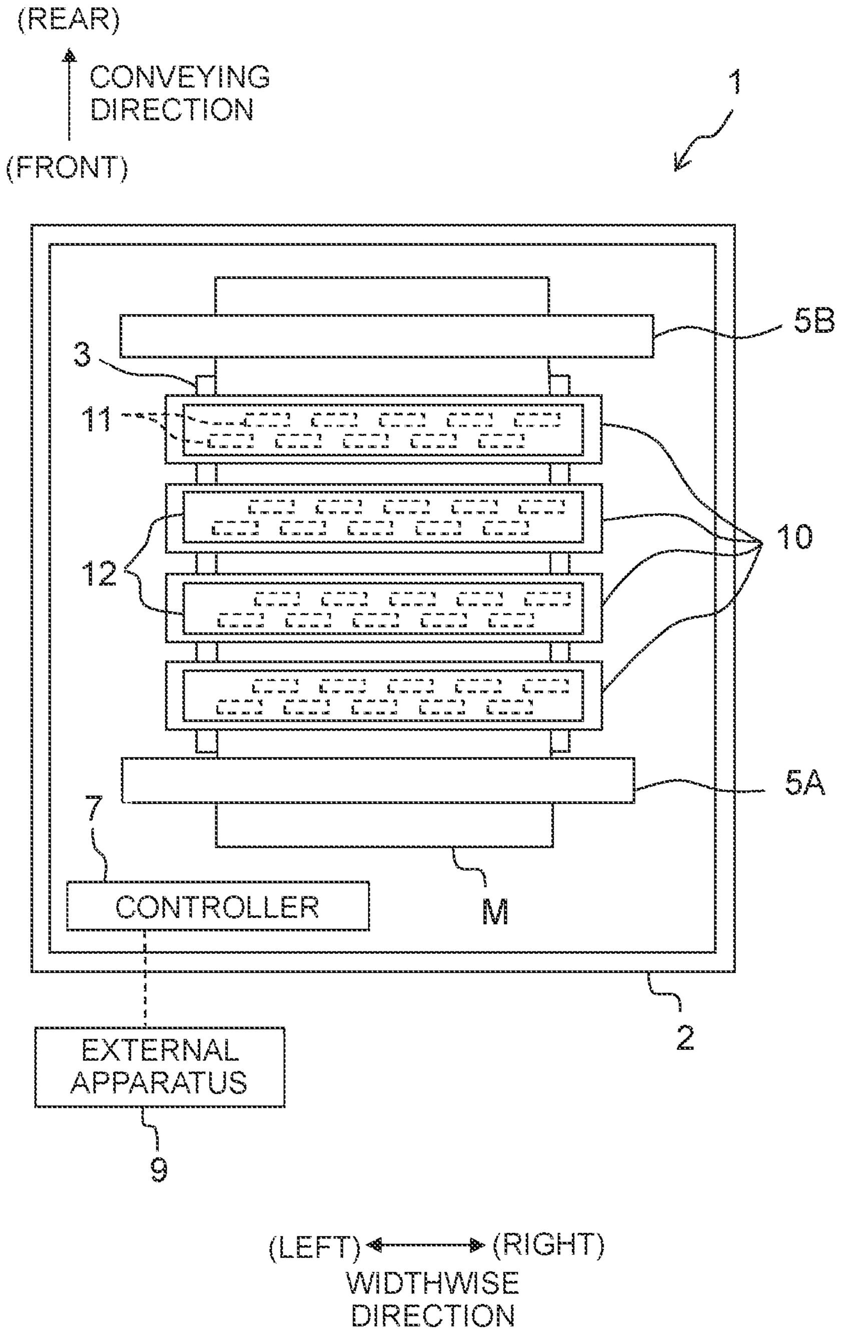
FIG. 1 is a schematic drawing of a structure of an ink-jet printer provided with an ink-jet head of the present teaching.

An explanation will be made below about a printer 1 provided with an ink-jet head 11 according to a first embodiment of the present teaching. With reference to FIG. 1, the conveying direction of a medium M (recording medium) corresponds to the front-rear direction of the printer 1. Further, the widthwise direction of the medium M corresponds to the left-right direction of the printer 1. Further, the direction orthogonal to the front-rear direction and the left-right direction, i.e., the direction perpendicular to the paper surface of FIG. 1 corresponds to the up-down direction of the printer 1. Note that the widthwise direction and the left-right direction exemplify the first direction of the present teaching, the conveying direction and the front-rear direction exemplify the second direction of the present teaching, and the up-down direction exemplifies the third direction.

[Printer 1]

As depicted in FIG. 1, the printer 1 is provided with, for example, a platen 3 which is accommodated in a casing 2, four line heads 10, two conveying rollers 5A, 5B, and a controller 7. The medium M is placed on the upper surface of the platen 3. The four line heads 10 are positioned to oppose to the platen 3 at positions over or above the platen 3. The four line heads 10 are aligned in the front-rear direction. Each of the line heads 10 is provided with a plurality of ink-jet heads 11 (ten ink-jet heads 11 in this embodiment), and a holder 12 which holds the plurality of ink-jet heads 11. The holder 12 is a rectangular plate-shaped member which is long in the left-right direction. The plurality of ink-jet heads 11 constitute two head rows which are aligned in the front-rear direction. Each of the head rows includes the five ink-jet heads 11 which are aligned in the left-right direction respectively. Note that the positions of the ink-jet heads 11 included in the two head rows are deviated from each other in the left-right direction. In other words, the ten ink-jet heads 11 are positioned in a zigzag form. Then, inks are supplied from ink tanks 13 (see FIG. 2) to the respective line heads 10.

The two conveying rollers 5A, 5B are positioned at the front and the rear of the platen 3 respectively. The two conveying rollers 5A, 5B are driven by an unillustrated motor respectively to convey the medium M on the platen 3 to the downstream (rear) in the conveying direction. In this embodiment, the medium M is a lengthy medium which is wound in a roll form. The medium M, which is wound in the roll form, is installed to the conveying roller 5A positioned upstream in the conveying direction. Note that the medium M is not limited thereto, which may be a lengthy medium constructed by mutually connecting end portions of a plurality of sheets of the medium, for example, with tape.

The controller 7 is connected to an external apparatus 9 such as a personal computer or the like so that the controller 7 can make mutual data communication therewith. The controller 7 controls the actions of respective parts of the printer 1 based on the instruction supplied from the external apparatus 9 or an unillustrated operation unit. For example, when the controller 7 receives a printing instruction from the external apparatus 9, the controller 7 controls the conveying rollers 5A, 5B to convey the medium M in the conveying direction. Further, concurrently therewith, the controller 7 controls the four line heads 10 to eject the ink droplets from the ink-jet heads 11 toward the medium M. Accordingly, an image is printed on the medium M. Note that the operation unit is an interface for the user to input the instruction with respect to the printer 1. The operation unit includes, for example, buttons and touch panels.

Figure 2:
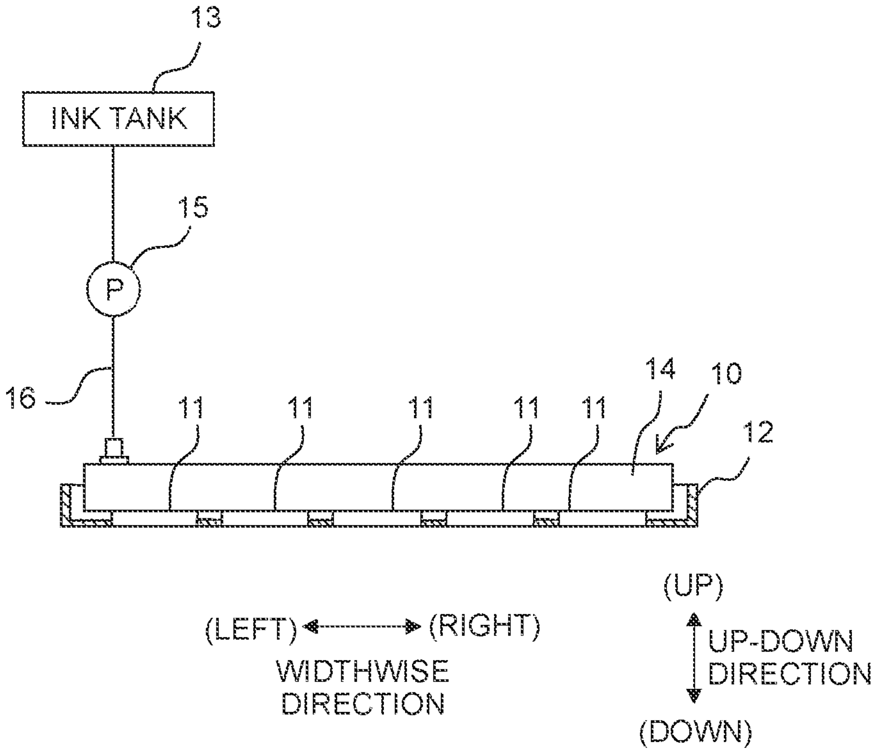
FIG. 2 is a schematic drawing illustrative of a relationship of connection between the ink-jet head and an ink supply unit.

As depicted in FIG. 2, a reservoir 14 is positioned over or above the plurality of ink-jet heads 11 in relation to each of the line heads 10. The reservoir 14 is connected to the ink tank 13 via a tube 16. A pressurizing pump 15 is positioned at the tube 16. The ink, which is supplied from the ink tank 13, is temporarily stored in the reservoir 14. The lower portion of the reservoir 14 is connected to the plurality of ink-jet heads 11. The ink is supplied from the reservoir 14 to the plurality of ink-jet heads 11. The ink tank 13, the reservoir 14, the pressurizing pump 15, and the tube 16 exemplify the ink supply unit of the present teaching.

[Ink-Jet Head 11]

Next, the structure of the ink-jet head 11 will be explained with reference to FIGS. 3 to 5.

Figure 3:
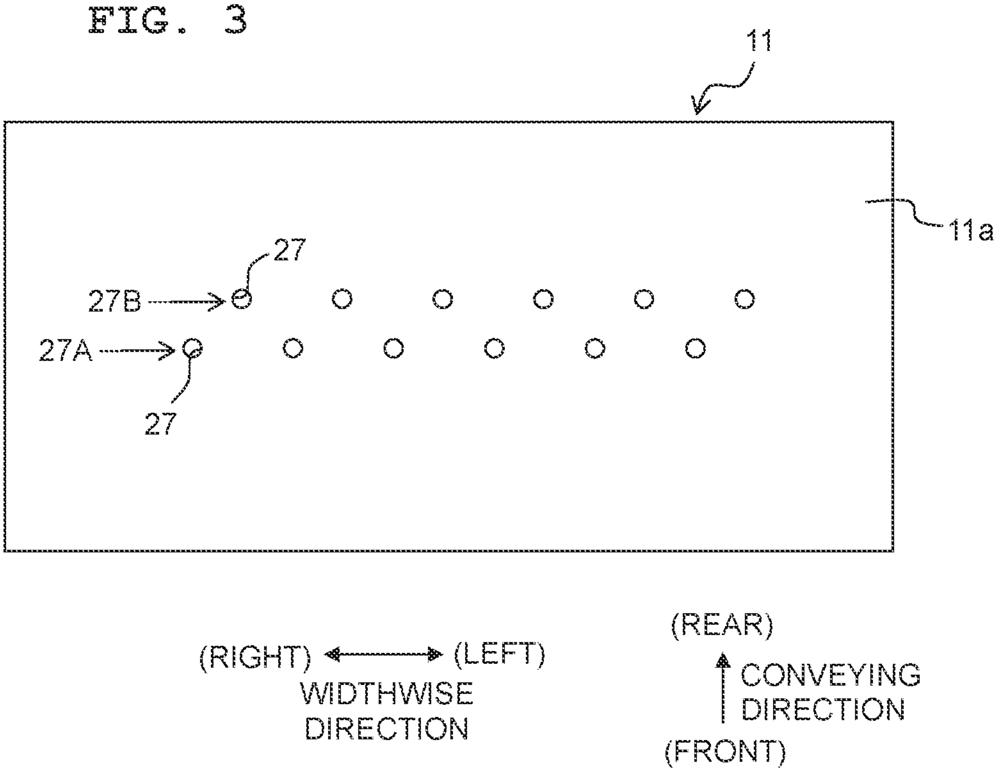
FIG. 3 is a bottom view of the ink-jet head according to a first embodiment.

As depicted in FIG. 3, a plurality of nozzles 27 (twelve in this embodiment) are open on the lower surface 11*a* of the ink-jet head 11. The twelve nozzles 27 form two nozzle rows 27A, 27B which are aligned in the front-rear direction. Each of the two nozzle rows 27A, 27B is formed by the six nozzles 27 which are aligned at equal intervals in the left-right direction. Note that the positions of the nozzles 27 included in the two nozzle rows 27A, 27B are deviated from each other in the left-right direction. In other words, the twelve nozzles 27 are formed in a zigzag form.

Figure 4:
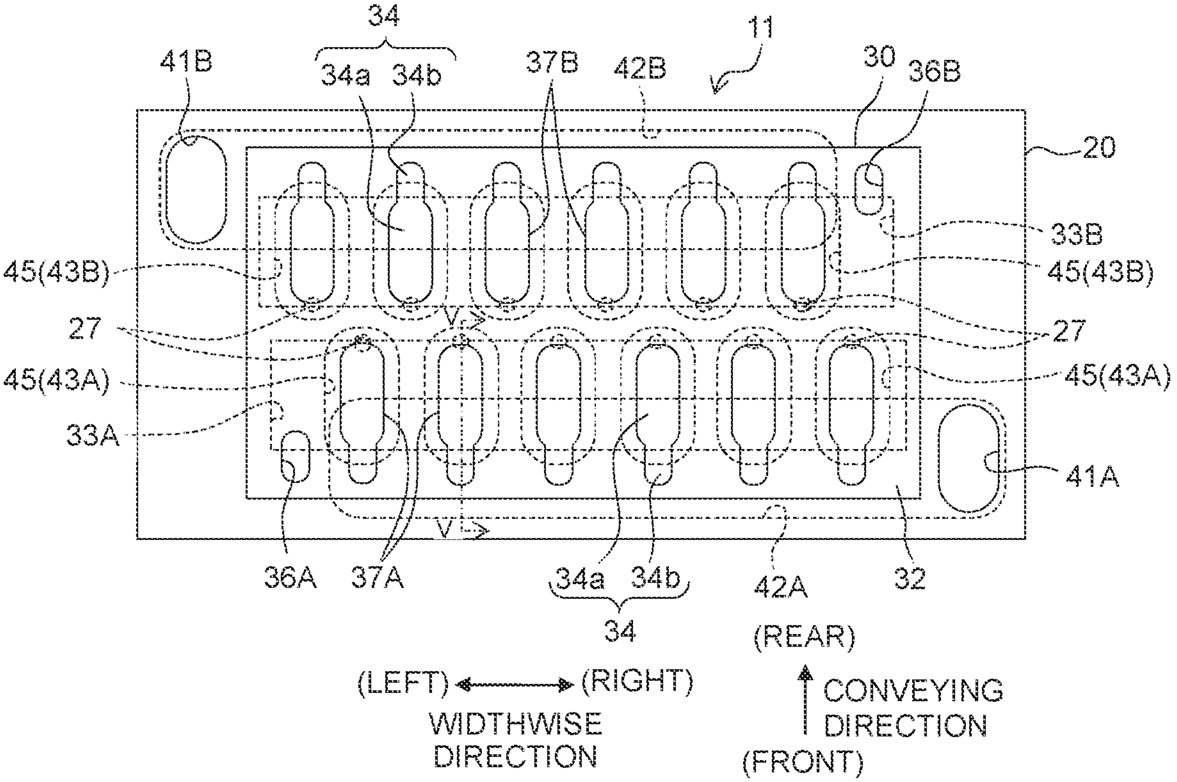
FIG. 4 is a top view of the ink-jet head according to the first embodiment.
Figure 5:
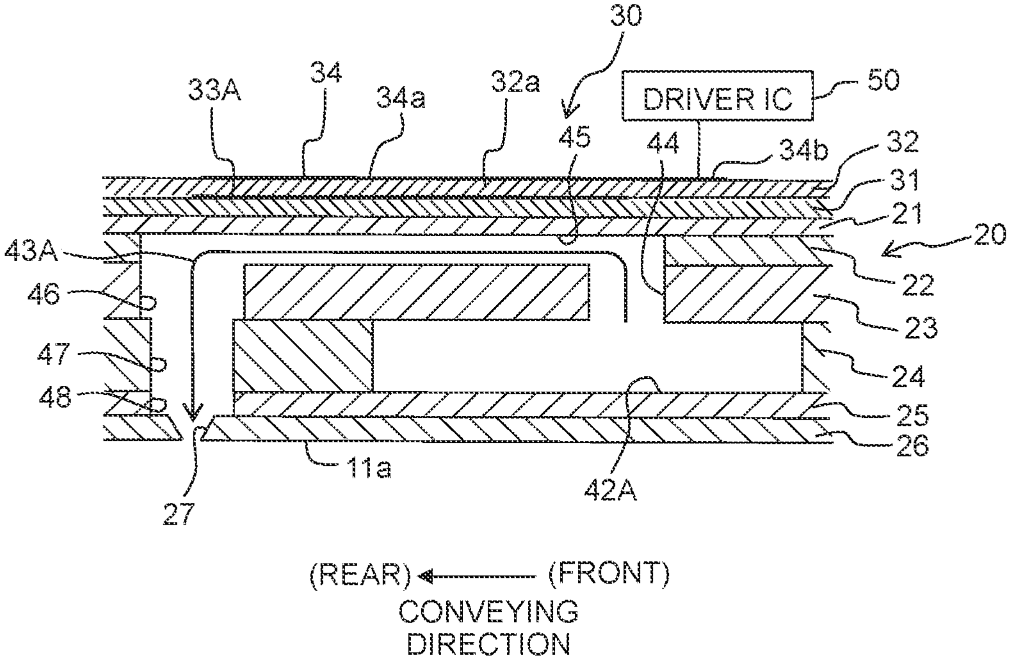
FIG. 5 is a sectional view taken along a line V-V depicted in FIG. 4.

As depicted in FIGS. 4 and 5, the ink-jet head 11 is provided with a flow passage member 20 and an actuator member 30. As depicted in FIG. 4, each of the flow passage member 20 and the actuator member 30 has a rectangular shape in which the length in the left-right direction is longer than the length in the front-rear direction. The sizes in the left-right direction and the front-rear direction of the flow passage member 20 are larger than those of the actuator member 30.

[Flow Passage Member 20]

As depicted in FIG. 4, two ink supply ports 41A, 41B are formed on the upper surface of the flow passage member 20. The two ink supply ports 41A, 41B are communicated with the reservoir 14 respectively. Further, the flow passage member 20 is formed with two manifolds 42A, 42B and a plurality of individual flow passages 43. Note that the flow passage member 20 of this embodiment is formed with the twelve individual flow passages 43 corresponding to the twelve nozzles 27 respectively.

The two manifolds 42A, 42B are aligned in the front-rear direction, and the two manifolds 42A, 42B extend in the left-right direction respectively. The manifold 42A is communicated with the ink supply port 41A, and the manifold 42B is communicated with the ink supply port 41B. The twelve individual flow passages 43 include the six individual flow passages 43A which are aligned in the left-right direction and the six individual flow passages 43B which are aligned in the left-right direction. The six individual flow passages 43A are connected to the manifold 42A respectively, and the six individual flow passages 43B are connected to the manifold 42B respectively. The six individual flow passages 43A and the six individual flow passages 43B are deviated from each other in the left-right direction. The ink supply port 41A is positioned on the right side with respect to the six individual flow passages 43A. On the contrary, the ink supply port 41B is positioned on the left side with respect to the six individual flow passages 43B.

As depicted in FIG. 5, the flow passage member 20 is composed of an ink sealing film 21 which is stacked in the up-down direction, and plates 22 to 26 each of which is made of metal.

The plate 22 is formed with through-holes which define a plurality of pressure chambers 45. The plate 23 is formed with through-holes which define communication passages 44, 46 that are provided for each of the pressure chambers 45. Each of the communication passages 44, 46 is overlapped in the up-down direction with one end or the other end in the front-rear direction of the corresponding pressure chamber 45. The plate 24 is formed with through-holes which define communication passages 47 each of which is provided for each of the communication passages 46. The plate 25 is formed with through-holes which define communication passages 48 each of which is provided for each of the communication passages 47. The communication passages 47, 48 are overlapped in the up-down direction with the corresponding communication passage 46. The nozzle plate 26 is formed with through-holes which define the plurality of nozzles 27. Each of the nozzles 27 is overlapped in the up-down direction with the communication passage 48. Then, each of the individual flow passages 43 is constructed by the communication passage 44, the pressure chamber 45, the communication passages 46 to 48, and the nozzle 27.

Further, the plate 24 is formed with through-holes which define the manifolds 42A, 42B. The respective communication passages 44 of the six individual flow passages 43A are overlapped in the up-down direction with the manifold 42A, and the respective communication passages 44 of the six individual flow passages 43B are overlapped in the up-down direction with the manifold 42B. Accordingly, the six individual flow passages 43A are communicated with the manifold 42A, and the six individual flow passages 43B are communicated with the manifold 42B.

Note that the two ink supply ports 41A, 41B are formed respectively in areas of the upper surface of the plate 22 in which the ink sealing film 21 and the actuator member 30 are not formed. The ink supply port 41A is communicated with the manifold 42A via a through-hole which penetrates through the plates 22, 23. The ink supply port 41B is communicated with the manifold 42B via a through-hole which penetrates through the plates 22, 23.

The ink sealing film 21 is composed of, for example, a material such as stainless steel or the like having low ink permeability. The sizes of the ink sealing film 21 in the left-right direction and the front-rear direction are substantially the same as those of the actuator member 30. The ink sealing film 21 is adhered to the upper surface of the plate 22 to seal all of the pressure chambers 45 formed in the plate 22.

In the flow passage member 20 constructed as described above, the ink, which is contained in the reservoir 14, is supplied to the manifolds 42A, 42B via the ink supply ports 41A, 41B. The ink, which is supplied to the manifold 42A, is supplied to the six individual flow passages 43A, and the ink, which is supplied to the manifold 42B, is supplied to the six individual flow passages 43B. Then, the actuator member 30 is driven as described later on. Accordingly, the pressure is generated and applied to the ink contained in the six individual flow passages 43A and the ink contained in the six individual flow passages 43B, and the ink droplets are ejected from the twelve nozzles 27.

[Actuator Member 30]

As depicted in FIGS. 4 and 5, the actuator member 30 has two piezoelectric layers 31, 32, a plurality of individual electrodes 34, and two common electrodes 33A, 33B.

Each of the two piezoelectric layers 31, 32 is composed of a piezoelectric material having a main component of lead zirconate titanate or the like.

The piezoelectric layer 31 is formed on the upper surface of the ink sealing film 21 so that all of the individual flow passages 43 formed for the flow passage member 20 are covered therewith. The two common electrodes 33A, 33B, which are aligned in the front-rear direction, are formed on the upper surface of the piezoelectric layer 31. Each of the two common electrodes 33A, 33B has a rectangular shape which is long in the left-right direction. The common electrode 33A is positioned so that the common electrode 33A is overlapped in the up-down direction with the six pressure chambers 45 communicated with the manifold 42A. The common electrode 33B is positioned so that the common electrode 33B is overlapped in the up-down direction with the six pressure chambers 45 communicated with the manifold 42B. The piezoelectric layer 32 is formed on the upper surfaces of the two common electrodes 33A, 33B and on an area of the upper surface of the piezoelectric layer 31 in which the two common electrodes 33A, 33B are not formed. Then, the plurality of individual electrodes 34 are formed on the upper surface of the piezoelectric layer 32.

As depicted in FIG. 4, the plurality of individual electrodes 34 are positioned so that the plurality of individual electrodes 34 are overlapped in the up-down direction with the plurality of pressure chambers 45 respectively. In other words, in this embodiment, the actuator member 30 has the twelve individual electrodes 34 which correspond to the twelve pressure chambers 45 respectively. The twelve individual electrodes 34 form two rows of individual electrode rows which are aligned in the front-rear direction. The individual electrode row positioned on the front side is formed by the six individual electrodes 34 which are aligned in the left-right direction, and the individual electrode row positioned on the rear side is also formed by the six individual electrodes 34 which are aligned in the left-right direction. The six individual electrodes 34 positioned on the front side and the six individual electrodes 34 positioned on the rear side are deviated from each other in the left-right direction.

As depicted in FIG. 4, each of the individual electrodes 34 has a main portion 34*a* and a protruding portion 34*b*. The main portion 34*a* is overlapped in the up-down direction with a central portion in the left-right direction of the corresponding pressure chamber 45. As for each of the individual electrodes 34 positioned on the front side, the protruding portion 34*b* protrudes frontwardly from the front end of the main portion 34*a*. On the other hand, as for each of the individual electrodes 34 positioned on the rear side, the protruding portion 34*b* protrudes rearwardly from the rear end of the main portion 34*a*. Each of the protruding portions 34*b* is not overlapped in the up-down direction with the corresponding pressure chamber 45. A contact, which is to be electrically connected to an FPC (Flexible Printed Circuit) (not depicted), is positioned at the protruding portion 34*b*. A driver IC 50, which is mounted on the FPC, selectively applies any one of the driving electric potential and the ground electric potential to each of the individual electrodes 34 by the aid of the wiring of the FPC based on the control performed by the controller 7.

As depicted in FIG. 4, the left end portion of the common electrode 33A is electrically connected to the FPC via a through-electrode 36A which penetrates in the up-down direction through the piezoelectric layer 32. The driver IC 50, which is mounted on the FPC, maintains the common electrode 33A at the ground electric potential by the aid of the wiring of the FPC and the through-electrode 36A. On the other hand, the right end portion of the common electrode 33B is electrically connected to the FPC via a through-electrode 36B which penetrates in the up-down direction through the piezoelectric layer 32. The driver IC 50, which is mounted on the FPC, maintains the common electrode 33B at the ground electric potential by the aid of the wiring of the FPC and the through-electrode 36B.

The common electrode 33A, the six individual electrodes 34 positioned on the front side, and six active portions 32*a* interposed by the common electrode 33A and the six individual electrodes 34 positioned on the front side form six piezoelectric elements 37A which are aligned in the left-right direction. Similarly, the common electrode 33B, the six individual electrodes 34 positioned on the rear side, and six active portions 32*a* interposed by the common electrode 33B and the six individual electrodes 34 positioned on the rear side form six piezoelectric elements 37B which are aligned in the left-right direction. Then, the left end portion of the common electrode 33A is positioned on the left side with respect to the six piezoelectric elements 37A, and the right end portion of the common electrode 33B is positioned on the right side with respect to the six piezoelectric elements 37B.

An explanation will now be made about the action of the piezoelectric element 37A corresponding to the nozzle 27 as exemplified by a case in which the ink droplets are ejected from one nozzle 27 positioned on the front side.

The driving electric potential is applied to the individual electrode 34 before the printer 1 starts the recording action. In this situation, the electric field, which is directed downwardly in the up-down direction, acts on the active portion 32*a* interposed by the common electrode 33A and the individual electrode 34 of the piezoelectric layer 32 by means of the electric potential difference between the individual electrode 34 and the common electrode 33A. In this situation, the polarization direction (downwardly in the up-down direction) of the active portion 32*a* is coincident with the direction of the electric field. The active portion 32*a* lengthens in the thickness direction (up-down direction) of the piezoelectric layer 32, and the active portion 32*a* shrinks in the in-plane direction of the piezoelectric layer 32. In accordance with the shrinkage deformation of the active portion 32*a*, the portions of the piezoelectric layer 31 and the ink sealing film 21, which are overlapped in the up-down direction with the pressure chamber 45, are deformed to protrude (downwardly) toward the pressure chamber 45. In this situation, the pressure chamber 45 has the small volume as compared with a case in which the piezoelectric layer 31 and the ink sealing film 21 are flat.

When the printer 1 starts the recording action, and the ink is ejected from the nozzle 27, then the electric potential of the individual electrode 34 corresponding to the nozzle 27 is firstly switched from the driving electric potential to the ground electric potential. In this situation, the electric potential difference between the individual electrode 34 and the common electrode 33A is decreased, and thus the shrinkage of the active portion 32*a* disappears. Accordingly, the portions of the piezoelectric layer 31 and the ink sealing film 21, which are overlapped in the up-down direction with the pressure chamber 45, are in the flat state. Accordingly, the volume of the pressure chamber 45 is increased. The ink is drawn from the manifold 42A into the pressure chamber 45.

After that, the electric potential of the individual electrode 34 corresponding to the nozzle 27 is switched from the ground electric potential to the driving electric potential. In this situation, the electric field, which is directed in the downward direction that is equal to the polarization direction, is generated in the active portion 32*a* by the electric potential difference between the individual electrode 34 and the common electrode 33A. The active portion 32*a* shrinks in the in-plane direction of the piezoelectric layer 32. Accordingly, the portions of the piezoelectric layer 31 and the ink sealing film 21, which are overlapped in the up-down direction with the pressure chamber 45, are deformed to protrude (downwardly) toward the pressure chamber 45. In this situation, the volume of the pressure chamber 45 is greatly decreased, and thus a large pressure is generated and applied to the ink contained in the pressure chamber 45. The ink, which is drawn into the pressure chamber 45, is ejected as the ink droplets from the nozzle 27.

In this embodiment, the driver IC 50 exemplifies the control circuit, the common electrode 33A exemplifies the first conductive part, and the common electrode 33B exemplifies the second conductive part. Further, the left end portion of the common electrode 33A exemplifies the end portion of the first conductive part positioned nearer to the control circuit, and the right end portion of the common electrode 33B exemplifies the end portion of the second conductive part positioned nearer to the control circuit. The piezoelectric element 37A exemplifies the first pressure generator, and the piezoelectric element 37B exemplifies the second pressure generator.

Note that in this embodiment, the ink-jet head 11 has the twelve individual flow passages 43 and the twelve piezoelectric elements. However, the numbers of the individual flow passages 43 and the piezoelectric elements may be smaller than twelve or larger than twelve. Further, for example, when the ink-jet head 11 has a dummy flow passage which does not contribute to the ejection of the ink, and a piezoelectric element which corresponds to the dummy flow passage, it is not necessarily indispensable that the number of the individual flow passages 43 is the same as the number of the piezoelectric elements.

In the ink-jet head 11 of this embodiment, the ink supply port 41A is positioned on the right side with respect to the six individual flow passages 43A. The ink, which flows into the manifold 42A from the ink supply port 41A, flows through the manifold 42A in the direction directed from the right to the left. In this case, when the electric power is applied to each of the piezoelectric elements, all of the electric energy applied to the piezoelectric element is not necessarily used for the physical deformation. In other words, any energy loss arises. The amount of the energy loss corresponds to the heat generation from the piezoelectric element. Then, the six piezoelectric elements are aligned in the direction in which the ink contained in the manifold 42A advances. On this account, as for the ink contained in the manifold 42A, the heat, which is accepted from the piezoelectric element, is increased as the ink advances leftwardly, and the temperature is raised. Further, the common electrode 33A is connected to the driver IC 50 at the left end portion. In this case, as for the common electrode 33A, the number of the individual electrodes 34 opposed to the common electrode 33A is increased as the position advances leftwardly. On this account, as for the common electrode 33A, the amount of movement of the electric charge is increased by an amount corresponding to the increase in the number of the individual electrodes 34 at positions nearer to the left end portion, and the amount of heat generation is increased. As a result, as for the ink contained in the manifold 42A, the temperature is more raised as the ink advances leftwardly on account of the influence of the heat generation brought about by the common electrode 33A.

On the other hand, the ink supply port 41B is positioned on the left side with respect to the six individual flow passages 43B. The ink, which flows into the manifold 42B from the ink supply port 41B, flows through the manifold 42B in the direction directed from the left to the right. In this case, when the electric power is applied to each of the piezoelectric elements, all of the electric energy applied to the piezoelectric element is not necessarily used for the physical deformation. In other words, any energy loss arises. The amount of the energy loss corresponds to the heat generation from the piezoelectric element. Then, the six piezoelectric elements are aligned in the direction in which the ink contained in the manifold 42B advances. On this account, as for the ink contained in the manifold 42B, the heat, which is accepted from the piezoelectric element, is increased as the ink advances rightwardly, and the temperature is raised. Further, the common electrode 33B is connected to the driver IC 50 at the right end portion. In this case, as for the common electrode 33B, the number of the individual electrodes 34 opposed to the common electrode 33B is increased as the position advances rightwardly. On this account, as for the common electrode 33B, the amount of movement of the electric charge is increased by an amount corresponding to the increase in the number of the individual electrodes 34 at positions nearer to the right end portion, and the amount of heat generation is increased. As a result, as for the ink contained in the manifold 42B, the temperature is more raised as the ink advances rightwardly on account of the influence of the heat generation brought about by the common electrode 33B.

In other words, the temperature gradient of the ink contained in the manifold 42A is raised in the direction directed from the right to the left, while the temperature gradient of the ink contained in the manifold 42B is raised in the direction directed from the left to the right, wherein the temperature gradients are opposite to one another. On this account, if the entire ink-jet head 11 is taken into consideration, the temperature gradients are offset. In other words, the temperature gradient is hardly generated in relation to the entire ink-jet head 11. The difference decreases in relation to the size of the ink droplet ejected from the nozzle 27 of the ink-jet head 11. As a result, it is possible to suppress the uneven density on the image printed by the ink-jet head 11 of this embodiment.

[First Modification]

Figure 6:
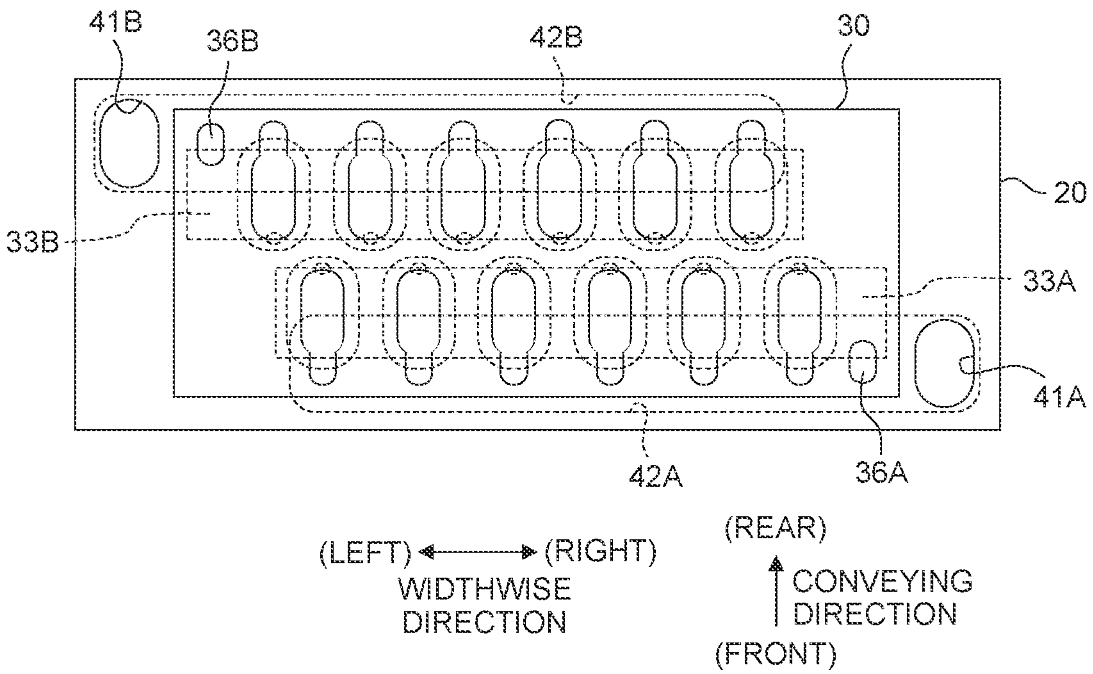
FIG. 6 is a top view illustrative of a modification of the ink-jet head according to the first embodiment.

In the case of the ink-jet head 11 of the first embodiment, the left end portion of the common electrode 33A is connected to the driver IC 50 via the through-electrode 36A, and the right end portion of the common electrode 33B is connected to the driver IC 50 via the through-electrode 36B. However, there is no limitation thereto. For example, as depicted in FIG. 6, the right end portion of the common electrode 33A may be connected to the driver IC 50 via the through-electrode 36A, and the left end portion of the common electrode 33B may be connected to the driver IC 50 via the through-electrode 36B.

In this case, as for the common electrode 33A, as having been already explained in the first embodiment, the amount of movement of the electric charge is more increased at positions nearer to the right end portion, and the amount of heat generation is more increased. On this account, when attention is focused on the influence of the heat generation brought about by the common electrode 33A, the temperature of the ink contained in the manifold 42A is raised in the direction directed to the right. On the contrary, when attention is focused on the influence of the heat generation brought about by the piezoelectric element, as having been already explained in the first embodiment, the temperature of the ink contained in the manifold 42A is raised in the direction directed to the left. In other words, the temperature gradient, which is caused by the heat generation of the common electrode 33A, is raised in the direction directed from the left to the right, while the temperature gradient, which is caused by the heat generation of the piezoelectric element, is raised in the direction directed from the right to the left. The temperature gradients are opposite to one another. As a result, the temperature gradients are offset. The temperature of the ink contained in the manifold 42A tends to be constant in the left-right direction.

On the other hand, as for the common electrode 33B, as having been already explained in the first embodiment, the amount of movement of the electric charge is more increased at positions nearer to the left end portion, and the amount of heat generation is more increased. On this account, when attention is focused on the influence of the heat generation brought about by the common electrode 33B, the temperature of the ink contained in the manifold 42B is raised in the direction directed to the left. On the contrary, when attention is focused on the influence of the heat generation brought about by the piezoelectric element, as having been already explained in the first embodiment, the temperature of the ink contained in the manifold 42B is raised in the direction directed to the right. In other words, the temperature gradient, which is caused by the heat generation of the common electrode 33B, is raised in the direction directed from the right to the left, while the temperature gradient, which is caused by the heat generation of the piezoelectric element, is raised in the direction directed from the left to the right. The temperature gradients are opposite to one another. As a result, the temperature gradients are offset. The temperature of the ink contained in the manifold 42B tends to be constant in the left-right direction.

In other words, according to the construction of the first modification, the ink contained in the manifold 42A and the ink contained in the manifold 42B have the temperatures which tend to be constant in the left-right direction. On this account, the temperature gradient is hardly generated in relation to the entire ink-jet head 11 as well. The difference decreases in relation to the size of the ink droplet ejected from the nozzle 27 of the ink-jet head 11. As a result, it is possible to suppress the uneven density on a printed image.

[Second Modification]

Figure 7:
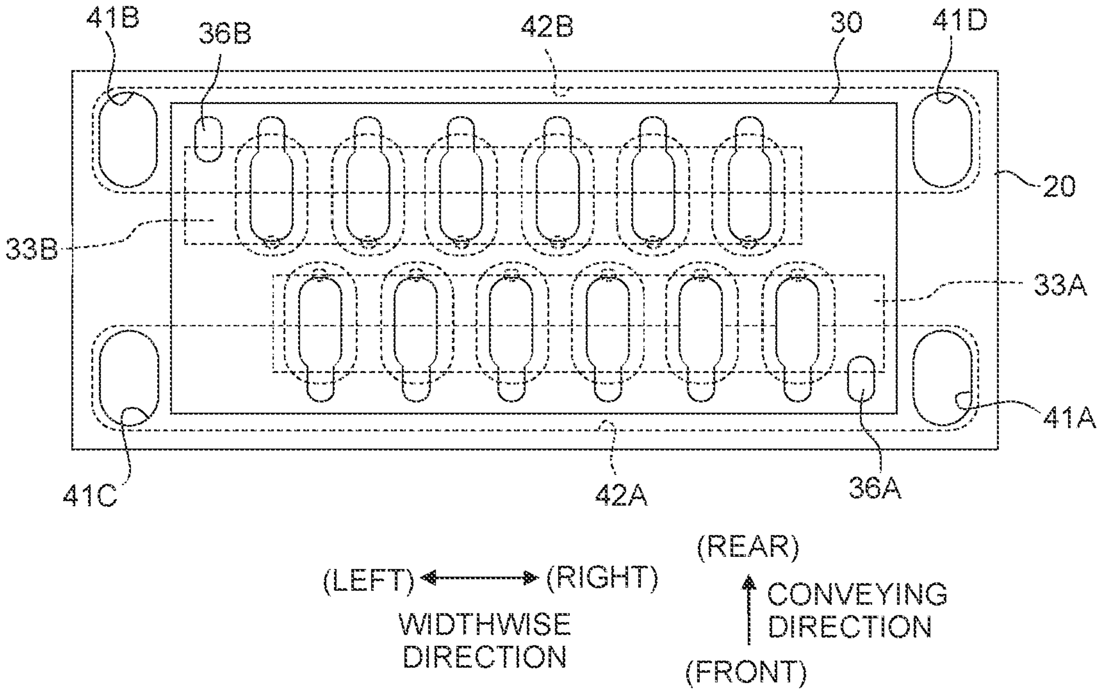
FIG. 7 is a top view illustrative of another modification of the ink-jet head according to the first embodiment.

Further, as depicted in FIG. 7, in the construction of the first modification, two ink discharge ports 41C, 41D may be formed on the upper surface of the flow passage member 20. The ink discharge port 41C may be formed at a position overlapped in the up-down direction with the left end portion of the manifold 42A, and the ink discharge port 41D may be formed at a position overlapped in the up-down direction with the right end portion of the manifold 42B. Then, the ink, which is discharged from the ink discharge ports 41C, 41D, may be recovered to a recovery tank (not depicted), and then the ink may be recovered to the ink tank 13 by means of a pump (not depicted).

According to the construction of the second modification, the ink contained in the manifolds 42A, 42B is recovered from the ink discharge ports 41C, 41D. Accordingly, it is possible to raise the flow rate of the ink in the manifolds 42A, 42B. On this account, the ink contained in the manifolds 42A, 42B is hardly affected by the heat generation caused by the piezoelectric element. The temperature tends to be constant more easily in the left-right direction. Further, even if the ejection amount per unit time from the nozzle 27 is increased, and the flow rate of the ink is lowered in the manifolds 42A, 42B, then it is possible to suppress the uneven density on a printed image in accordance with the mechanism which is the same as or equivalent to that of the first modification.

Second Embodiment

Next, a second embodiment of the present teaching will be explained with reference to FIGS. 8 to 11. An ink-jet head 111 according to the second embodiment has a different structure in relation to the actuator member 30 of the ink-jet head 11 according to the second modification described above. On this account, the structure, which is different from that of the second modification, will be explained below. Any explanation about the common structure will be omitted.

[Actuator Member 130]

Figure 8:
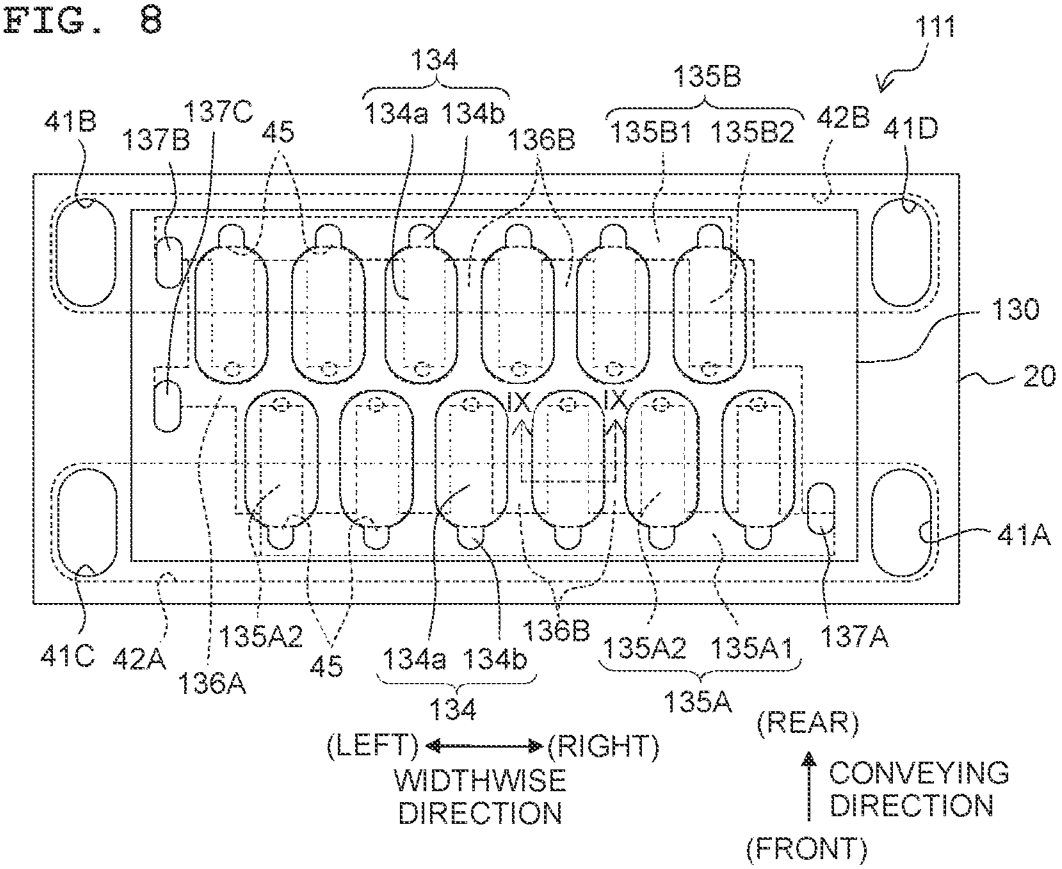
FIG. 8 is a top view illustrative of an ink-jet head according to a second embodiment.
Figure 9:
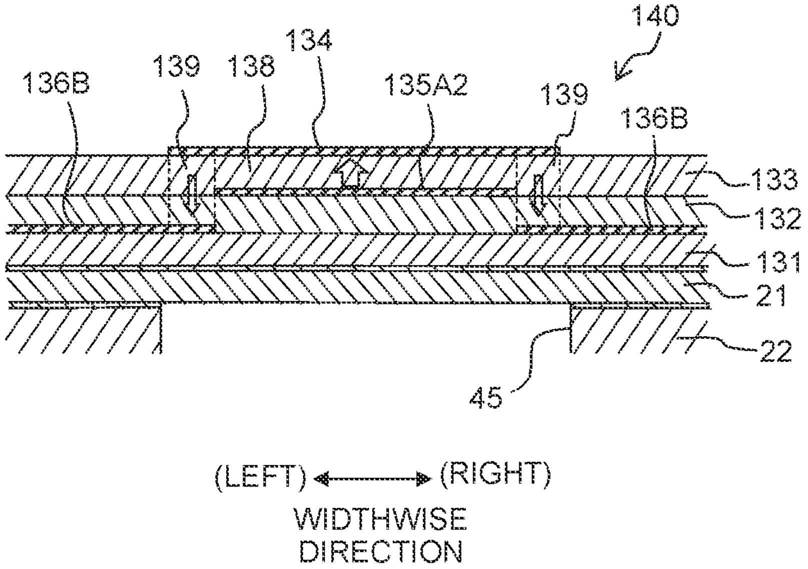
FIG. 9 is a partial sectional view taken along a line IX-IX depicted in FIG. 8.

As depicted in FIGS. 8 and 9, an actuator member 130 has three piezoelectric layers 131 to 133, a plurality of (twelve in this embodiment) individual electrodes 134, high electric potential electrode portions 135A, 135B, and a low electric potential electrode portion 136.

Each of the three piezoelectric layers 131 to 133 is composed of a piezoelectric material having a main component of lead zirconate titanate or the like. The three piezoelectric layers 131 to 133 are stacked in the up-down direction. The piezoelectric layer 131 is adhered to the upper surface of the ink sealing film 21 with an adhesive.

The plurality of individual electrodes 134, the high electric potential electrode portions 135A, 135B, and the low electric potential electrode portion 136 are positioned on the side opposite to the ink sealing film 21 in relation to the piezoelectric layer 131.

As depicted in FIG. 9, each of the individual electrodes 134 is formed on the upper surface of the piezoelectric layer 133 while corresponding to the pressure chamber 45. The individual electrode 134 has a main portion 134*a* and a protruding portion 134*b*. The main portion 134*a* is overlapped in the up-down direction with a substantially entire area of the corresponding pressure chamber 45. The protruding portion 134*b* protrudes frontwardly or rearwardly from the main portion 134*a*. The protruding portion 134*b* is not overlapped in the up-down direction with the corresponding pressure chamber 45. A contact, which is to be electrically connected to the FPC, is positioned at the protruding portion 134*b*. The driver IC 50, which is mounted on the FPC, selectively applies any one of the high electric potential (VDD electric potential) and the low electric potential (GND electric potential) to each of the individual electrodes 134 by the aid of the wiring of the FPC in accordance with the control performed by the controller 7.

The high electric potential electrode portions 135A, 135B are formed on the upper surface of the piezoelectric layer 132, and the high electric potential electrode portions 135A, 135B are aligned in the front-rear direction. As depicted in FIG. 8, the high electric potential electrode portion 135A is composed of a high electric potential wiring 135A1 and six high electric potential electrodes 135A2. The high electric potential wiring 135A1 extends in the left-right direction at the front end portion of the actuator member 130. The six high electric potential electrodes 135A2 extend rearwardly from the high electric potential wiring 135A1 respectively. The six high electric potential electrodes 135A2 correspond to the six pressure chambers 45 positioned on the front side and the six individual electrodes 134 positioned on the front side respectively. Each of the high electric potential electrodes 135A2 is overlapped in the up-down direction with the corresponding individual electrode 134 and the central portion in the left-right direction of the corresponding pressure chamber 45. The high electric potential electrode portion 135B is composed of a high electric potential wiring 135B1 and six high electric potential electrodes 135B2. The high electric potential wiring 135B1 extends in the left-right direction at the rear end portion of the actuator member 130. The six high electric potential electrodes 135B2 extend frontwardly from the high electric potential wiring 135B1 respectively. The six high electric potential electrodes

135B2 correspond to the six pressure chambers 45 positioned on the rear side and the six individual electrodes 134 positioned on the rear side respectively. Each of the high electric potential electrodes 135B2 is overlapped in the up-down direction with the corresponding individual electrode 134 and the central portion in the left-right direction of the corresponding pressure chamber 45.

Then, the right end portion of the high electric potential wiring 135A1 is electrically connected to the FPC via a through-electrode 137A which penetrates in the up-down direction through the piezoelectric layer 133. A constant electric potential (VCOM electric potential), which is slightly higher than the VDD electric potential, is applied to the high electric potential electrode 135A2 by the driver IC 50 mounted on the FPC, by the aid of the wiring of the FPC, the through-electrode 137A, and the high electric potential wiring 135A1. On the other hand, the left end portion of the high electric potential wiring 135B1 is electrically connected to the FPC via a through-electrode 137B which penetrates in the up-down direction through the piezoelectric layer 133. The constant electric potential (VCOM electric potential), which is slightly higher than the VDD electric potential, is applied to the high electric potential electrode 135B2 by the driver IC 50 mounted on the FPC, by the aid of the wiring of the FPC, the through-electrode 137B, and the high electric potential wiring 135B1.

The low electric potential electrode portion 136 is formed on the upper surface of the piezoelectric layer 131. The low electric potential electrode portion 136 is composed of a low electric potential wiring 136A and fourteen low electric potential electrodes 136B. The low electric potential wiring 136A extends in the front-rear direction at a central portion in the front-rear direction of the actuator member 130. Seven low electric potential electrodes 136B of the fourteen low electric potential electrodes 136B extend frontwardly from the low electric potential wiring 136A, and another seven low electric potential electrodes 136B extend rearwardly from the low electric potential wiring 136A. Except for the low electric potential electrodes 136B positioned at the both left and right ends, each of the low electric potential electrodes 136B positioned frontwardly has a portion which ranges over the two pressure chambers 45 that are adjacent to one another on the left and the right and which is overlapped in the up-down direction with the two pressure chambers 45. Then, the low electric potential electrode 136B positioned at the left end has a portion which is overlapped in the up-down direction with the left end portion of the pressure chamber 45 positioned at the left end. The low electric potential electrode 136B positioned at the right end has a portion which is overlapped in the up-down direction with the right end portion of the pressure chamber 45 positioned at the right end. Similarly, except for the low electric potential electrodes 136B positioned at the both left and right ends, each of the low electric potential electrodes 136B positioned rearwardly also has a portion which ranges over the two pressure chambers 45 that are adjacent to one another on the left and the right and which is overlapped in the up-down direction with the two pressure chambers 45. Then, the low electric potential electrode 136B positioned at the left end has a portion which is overlapped in the up-down direction with the left end portion of the pressure chamber 45 positioned at the left end. The low electric potential electrode 136B positioned at the right end has a portion which is overlapped in the up-down direction with the right end portion of the pressure chamber 45 positioned at the right end.

Then, the left end portion of the low electric potential wiring 136A is electrically connected to the FPC by the aid of a through-electrode 137C which penetrates in the up-down direction through the piezoelectric layers 132, 133. The driver IC 50, which is mounted on the FPC, applies the low electric potential (GND electric potential) to the low electric potential electrode 136B by the aid of the wiring of the FPC, the through-electrode 137C, and the low electric potential wiring 136A.

As depicted in FIG. 9, the portion of the piezoelectric layer 133, which is interposed in the up-down direction between the individual electrode 134 and the high electric potential electrode 135A2, is referred to as "first active portion 138". Similarly, the portion of the piezoelectric layer 133, which is interposed in the up-down direction between the individual electrode 134 and the high electric potential electrode 135B2, is also referred to as "first active portion 138". The portions of the piezoelectric layers 132, 133, which are interposed in the up-down direction between the individual electrode 134 and the low electric potential electrode 136B, are referred to as "second active portions 139". The first active portion 138 is principally polarized in the upward direction, and the second active portion 139 is principally polarized in the downward direction. The actuator member 130 has pressure generators 140 for the respective pressure chambers 45. Each of the pressure generators 140 includes one first active portion 138 and two second active portions 139 which interpose the first active portion 138 in the left-right direction.

Figure 10:
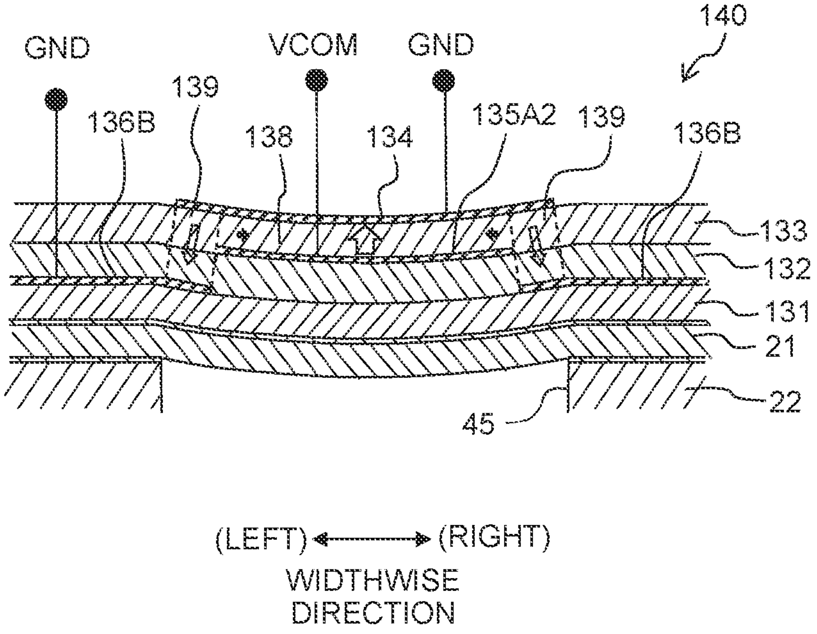
FIG. 10 is a drawing illustrative of the action of a piezoelectric element in relation to the cross section depicted in FIG. 9.
Figure 11:
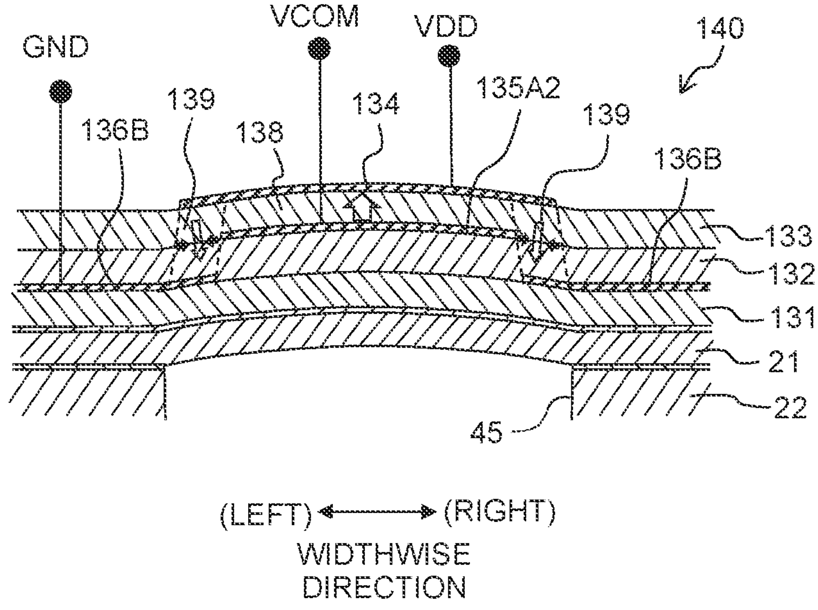
FIG. 11 is a drawing illustrative of the action of the piezoelectric element in relation to the cross section depicted in FIG. 9.

With reference to FIGS. 10 and 11, an explanation will now be made about the action of the pressure generator 140 corresponding to the nozzle 27, as exemplified by a case in which the ink droplets are ejected from one nozzle 27 positioned on the front side.

As depicted in FIG. 10, the low electric potential (GND electric potential) is applied to the respective individual electrodes 134 before the printer 1 starts the recording action. In this situation, the electric field, which is directed in the upward direction that is equal to the polarization direction, is generated in the first active portion 138 by the electric potential difference between the individual electrode 134 and the high electric potential electrode 135A2. The first active portion 138 shrinks in the in-plane direction (direction along the left-right direction and the front-rear direction). Accordingly, the portion of the stack composed of the piezoelectric layers 131 to 133, which is overlapped in the up-down direction with the pressure chamber 45, warps so that the portion protrudes (downwardly) toward the pressure chamber 45. In this situation, the volume of the pressure chamber 45 is decreased as compared with a case in which the stack is flat.

When the printer 1 starts the recording action to eject the ink from the nozzle 27, as depicted in FIG. 11, the electric potential of the individual electrode 134 corresponding to the nozzle 27 is firstly switched from the low electric potential (GND electric potential) to the high electric potential (VDD electric potential). In this situation, the electric potential difference between the individual electrode 134 and the high electric potential electrode 135A2 is decreased, and thus the shrinkage of the first active portion 138 is decreased. On the other hand, the electric field, which is directed in the downward direction that is equal to the polarization direction, is generated in the two second active portions 139 by the electric potential difference between the individual electrode 134 and the low electric potential electrode 136B. The two second active portions 139 shrink in the in-plane direction. Accordingly, the portion of the stack composed of the piezoelectric layers 131 to 133, which is overlapped in the up-down direction with the pressure chamber 45, warps so that the portion protrudes (upwardly) in the direction to make separation from the pressure chamber 45. Accordingly, the volume of the pressure chamber 45 is increased as compared with FIG. 10, and the ink is drawn into the pressure chamber 45 from the manifold 42A.

After that, as depicted in FIG. 10, the electric potential of the individual electrode 134 corresponding to the nozzle 27 is switched from the high electric potential (VDD electric potential) to the low electric potential (GND electric potential). In this situation, the electric potential difference between the individual electrode 134 and the low electric potential electrode 136B disappears, and thus the shrinkage of the second active portion 139 is eliminated. On the other hand, the electric field, which is directed in the upward direction that is equal to the polarization direction, is generated in the first active portion 138 by the electric potential difference between the individual electrode 134 and the high electric potential electrode 135A2. The first active portion 138 shrinks in the in-plane direction. Accordingly, the portion of the stack composed of the piezoelectric layers 131 to 133, which is overlapped in the up-down direction with the pressure chamber 45, warps (downwardly) so that the portion protrudes toward the pressure chamber 45. In this situation, the volume of the pressure chamber 45 is greatly decreased, and thus the large pressure is generated and applied to the ink contained in the pressure chamber 45. The ink, which is drawn into the pressure chamber 45, is ejected as the ink droplets from the nozzle 27.

In this embodiment, the driver IC 50 exemplifies the control circuit, the high electric potential wiring 135A1 exemplifies the first conductive part, and the high electric potential wiring 135B1 exemplifies the second conductive part. Further, the right end portion of the high electric potential wiring 135A1 exemplifies the end portion of the first conductive part positioned nearer to the control circuit, and the left end portion of the high electric potential wiring 135B1 exemplifies the end portion of the second conductive part positioned nearer to the control circuit. The six pressure generators 140 positioned on the front side exemplify the first pressure generator, and the six pressure generators 140 positioned on the rear side exemplify the second pressure generator.

In this embodiment, the ink-jet head 111 has the twelve individual flow passages 43 and the twelve piezoelectric elements. However, the numbers of the individual flow passages 43 and the piezoelectric elements may be smaller than twelve or larger than twelve. Further, for example, when the ink-jet head 111 has a dummy flow passage which does not contribute to the ejection of the ink, and a piezoelectric element which corresponds to the dummy flow passage, it is not necessarily indispensable that the number of the individual flow passages 43 is the same as the number of the piezoelectric elements.

According to the construction of this embodiment, as for the high electric potential wiring 135A1, the number of the connected first active portions 138 is increased as the position advances rightwardly. On this account, as for the high electric potential wiring 135A1, the amount of movement of the electric charge is increased by the amount of increase in the number of the first active portions 138 as the position approaches the right end portion, and the amount of heat generation is increased. On this account, when attention is focused on the influence of the heat generation brought about by the high electric potential wiring 135A1, the temperature of the ink contained in the manifold 42A is raised in the direction directed to the right. On the other hand, as having been already explained in the first embodiment, when attention is focused on the influence of the heat generation brought about by the pressure generator 140, the temperature of the ink contained in the manifold 42A is raised in the direction directed to the left. In other words, the temperature gradient, which is caused by the heat generation brought about by the high electric potential wiring 135A1, is raised in the direction directed from the left to the right, while the temperature gradient, which is caused by the heat generation brought about by the pressure generator 140, is raised in the direction directed from the right to the left. The temperature gradients are opposite to one another. As a result, the temperature gradients are offset. The temperature of the ink contained in the manifold 42A tends to be constant in the left-right direction.

On the other hand, as for the high electric potential wiring 135B1, the number of the connected first active portions 138 is increased as the position advances leftwardly. On this account, as for the high electric potential wiring 135B1, the amount of movement of the electric charge is increased by the amount of increase in the number of the first active portions 138 as the position approaches the left end portion, and the amount of heat generation is increased. On this account, when attention is focused on the influence of the heat generation brought about by the high electric potential wiring 135B1, the temperature of the ink contained in the manifold 42B is raised in the direction directed to the left. On the other hand, as having been already explained in the first embodiment, when attention is focused on the influence of the heat generation brought about by the pressure generator 140, the temperature of the ink contained in the manifold 42B is raised in the direction directed to the right. In other words, the temperature gradient, which is caused by the heat generation brought about by the high electric potential wiring 135B1, is raised in the direction directed from the right to the left, while the temperature gradient, which is caused by the heat generation brought about by the pressure generator 140, is raised in the direction directed from the left to the right. The temperature gradients are opposite to one another. As a result, the temperature gradients are offset. The temperature of the ink contained in the manifold 42B tends to be constant in the left-right direction.

In other words, according to the construction of this embodiment, the temperatures of the ink contained in the manifold 42A and the ink contained in the manifold 42B tend to be constant in the left-right direction. Therefore, it is possible to suppress the uneven density on a printed image. Further, the ink contained in the manifolds 42A, 42B is recovered from the ink discharge ports 41C, 41D, and thus it is possible to raise the flow rate of the ink contained in the manifolds 42A, 42B. On this account, the ink contained in the manifolds 42A, 42B is hardly affected by the heat generation brought about by the pressure generator. The temperature tends to be constant more easily in the left-right direction. Further, even if the ejection amount per unit time from the nozzle 27 is increased, and the flow rate of the ink is lowered in the manifolds 42A, 42B, then the temperature gradient is hardly caused in the entire ink-jet head 111, and hence the difference is decreased in relation to the size of the ink droplet ejected from the nozzle 27 in the ink-jet head 111. As a result, it is possible to further suppress the uneven density on the printed image.

[Third Modification]

Next, an explanation will be made with reference to FIG. 12 about a modification (third modification) of the second embodiment. The structures of the flow passage member and the actuator member differ between an ink-jet head 211 of the third modification and the ink-jet head 111 of the second embodiment described above. Specifically, the structure of the manifold of the flow passage member differs, and the structures of the high electric potential electrode portion and the low electric potential electrode portion of the actuator member differ. On the other hand, the structures of the respective individual flow passages and the structures of the respective pressure generators of the ink-jet head 211 of the third modification are common to those of the second embodiment. On this account, in the following description, the structures, which are different from those of the second embodiment, will be explained below, and any explanation about the common structures will be omitted.

Figure 12:
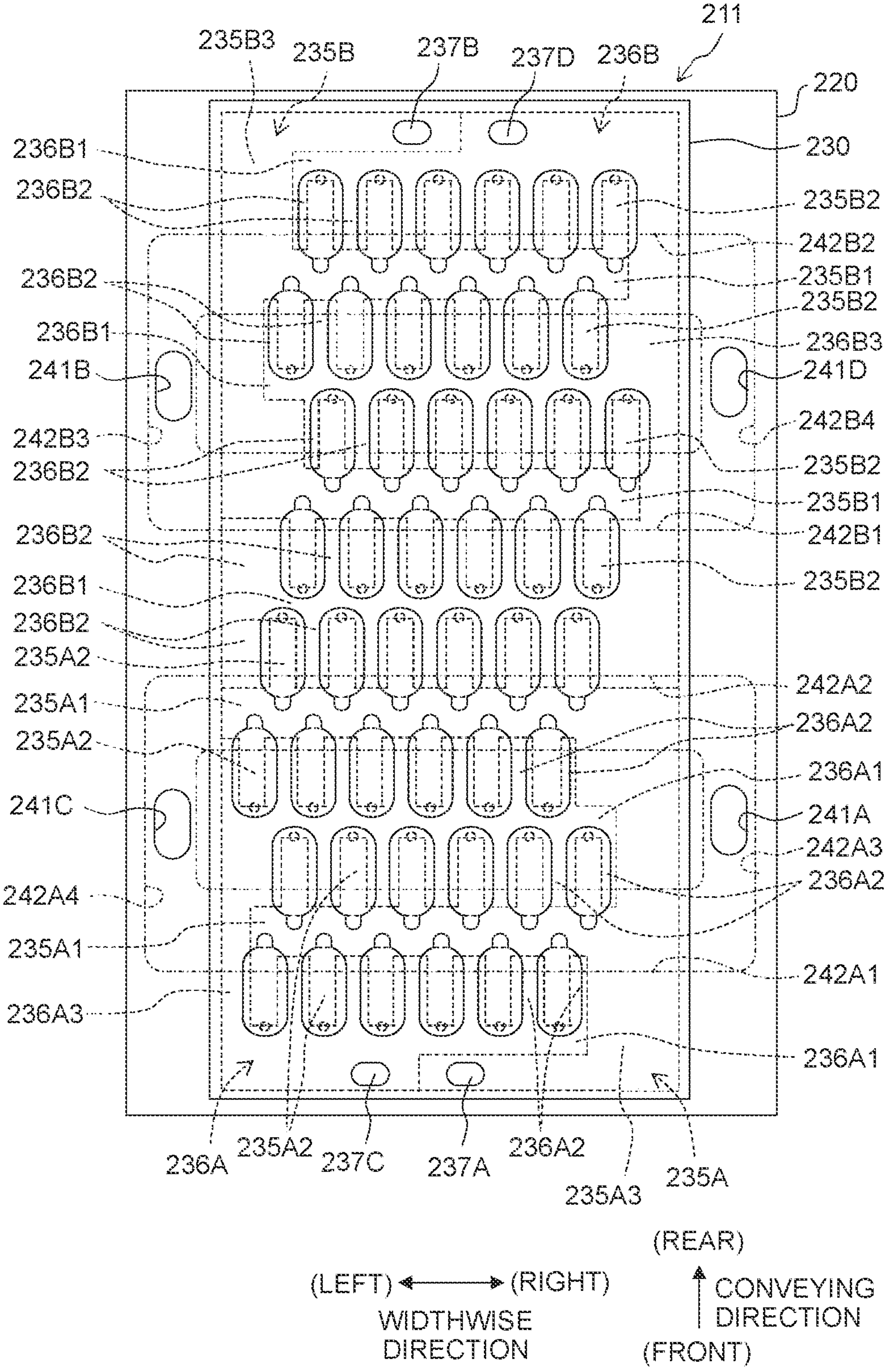
FIG. 12 is a top view illustrative of a modification of the ink-jet head according to the second embodiment.

As depicted in FIG. 12, a flow passage member 220 of the ink-jet head 211 of the third modification has four manifolds 242A1, 242A2, 242B1, 242B2 which extend in the left-right direction respectively, and four connecting flow passages 242A3, 242A4, 242B3, 242B4 which extend in the front-rear direction respectively. The right end of the manifold 242A1 and the right end of the manifold 242A2 are connected to the front end and the rear end of the connecting flow passage 242A3 respectively. The left end of the manifold 242A1 and the left end of the manifold 242A2 are connected to the front end and the rear end of the connecting flow passage 242A4 respectively. The right end of the manifold 242B1 and the right end of the manifold 242B2 are connected to the front end and the rear end of the connecting flow passage 242B4 respectively. The left end of the manifold 242B1 and the left end of the manifold 242B2 are connected to the front end and the rear end of the connecting flow passage 242B3 respectively. Then, the ink supply port 241A is communicated with the connecting flow passage 242A3, and the ink discharge port 241C is communicated with the connecting flow passage 242A4. Further, the ink supply port 241B is communicated with the connecting flow passage 242B3, and the ink discharge port 241D is communicated with the connecting flow passage 242B4.

The ink, which flows from the ink tank 13 via the ink supply port 241A into the connecting flow passage 242A3, advances in the front-rear direction. The ink flows in the leftward direction through the manifold 242A1 and the manifold 242A2. Then, the ink, which flows through the manifold 242A1 and the manifold 242A2, flows into the plurality of individual flow passages 43 which are communicated with the manifold 242A1 and the manifold 242A2 respectively. The ink, which does not flow into the plurality of individual flow passages 43, flows into the connecting flow passage 242A4 at the left ends of the manifold 242A1 and the manifold 242A2. The ink is recovered to the ink tank 13 via the ink discharge port 241C.

On the other hand, the ink, which flows from the ink tank 13 via the ink supply port 241B into the connecting flow passage 242B3, advances in the front-rear direction. The ink flows in the rightward direction through the manifold 242B1 and the manifold 242B2. Then, the ink, which flows through the manifold 242B1 and the manifold 242B2, flows into the plurality of individual flow passages 43 which are communicated with the manifold 242B1 and the manifold 242B2 respectively. The ink, which does not flow into the plurality of individual flow passages 43, flows into the connecting flow passage 242B4 at the right ends of the manifold 242B1 and the manifold 242B2. The ink is recovered to the ink tank 13 via the ink discharge port 241D.

Further, the actuator member 230 has two high electric potential electrode portions 235A, 235B. The two high electric potential electrode portions 235A, 235B are aligned in the front-rear direction.

The high electric potential electrode portion 235A is composed of two high electric potential wirings 235A1, a plurality of high electric potential electrodes 235A2, and a connecting portion 235A3. The two high electric potential wirings 235A1 are aligned in the front-rear direction, and the two high electric potential wirings 235A1 extend in the left-right direction respectively. The plurality of high electric potential electrodes 235A2 extend frontwardly or rearwardly from each of the high electric potential wirings 235A1. The connecting portion 235A3 is connected to the right end portions of the respective high electric potential wirings 235A1. The connecting portion 235A3 extends in the front-rear direction. The front end of the connecting portion 235A3 protrudes leftwardly. Then, the forward end portion of the connecting portion 235A3, which protrudes leftwardly, is electrically connected to the FPC by the aid of a through-electrode 237A which penetrates through the piezoelectric layer 133.

The high electric potential electrode portion 235B is composed of two high electric potential wirings 235B1, a plurality of high electric potential electrodes 235B2, and a connecting portion 235B3. The two high electric potential wirings 235B1 are aligned in the front-rear direction, and the two high electric potential wirings 235B1 extend in the left-right direction respectively. The plurality of high electric potential electrodes 235B2 extend frontwardly or rearwardly from each of the high electric potential wirings 235B1. The connecting portion 235B3 is connected to the left end portions of the respective high electric potential wirings 235B1. The connecting portion 235B3 extends in the front-rear direction. The rear end of the connecting portion 235B3 protrudes rightwardly. Then, the forward end portion of the connecting portion 235B3, which protrudes rightwardly, is electrically connected to the FPC by the aid of a through-electrode 237B which penetrates through the piezoelectric layer 133.

Further, the actuator member 230 has two low electric potential electrode portions 236A, 236B. The two low electric potential electrode portions 236A, 236B are aligned in the front-rear direction.

The low electric potential electrode portion 236A is composed of two low electric potential wirings 236A1, a plurality of low electric potential electrodes 236A2, and a connecting portion 236A3. The two low electric potential wirings 236A1 are aligned in the front-rear direction, and the two low electric potential wirings 236A1 extend in the left-right direction respectively. The plurality of low electric potential electrodes 236A2 extend frontwardly or rearwardly from each of the low electric potential wirings 236A1. The connecting portion 236A3 is connected to the left end portions of the respective low electric potential wirings 236A1. The front end portion of the low electric potential wiring 236A1 positioned frontwardly is electrically connected to the FPC by the aid of a through-electrode 237C which penetrates through the piezoelectric layers 132, 133.

The low electric potential electrode portion 236B is composed of three low electric potential wirings 236B1, a plurality of low electric potential electrodes 236B2, and a connecting portion 236B3. The three low electric potential wirings 236B1 are aligned in the front-rear direction, and the three low electric potential wirings 236B1 extend in the left-right direction respectively. The plurality of low electric potential electrodes 236B2 extend frontwardly or rearwardly from each of the low electric potential wirings 236B1. The connecting portion 236B3 is connected to the right end portions of the respective low electric potential wirings 236B1. The rear end portion of the low electric potential wiring 236B1 positioned most rearwardly is electrically connected to the FPC by the aid of a through-electrode 237D which penetrates through the piezoelectric layers 132, 133.

In the third modification, the high electric potential wiring 235A1 positioned frontwardly exemplifies the first control unit, the high electric potential wiring 235A1 positioned rearwardly exemplifies the third conductive part, the high electric potential wiring 235B1 positioned frontwardly exemplifies the fourth conductive part, and the high electric potential wiring 235B1 positioned rearwardly exemplifies the second conductive part. The right end portion of the high electric potential wiring 235A1 positioned frontwardly exemplifies the end portion of the first conductive part positioned nearer to the control circuit, and the right end portion of the high electric potential wiring 235A1 positioned rearwardly exemplifies the end portion of the third conductive part positioned nearer to the control circuit. The left end portion of the high electric potential wiring 235B1 positioned frontwardly exemplifies the end portion of the fourth conductive part positioned nearer to the control circuit, and the left end portion of the high electric potential wiring 235B1 positioned rearwardly exemplifies the end portion of the second conductive part positioned nearer to the control circuit. Further, the manifold 242A1 exemplifies the first common flow passage, the manifold 242A2 exemplifies the third common flow passage, the manifold 242B1 exemplifies the fourth common flow passage, and the manifold 242B2 exemplifies the second common flow passage. The ink supply port 241A exemplifies the first ink supply port, the ink supply port 241B exemplifies the second ink supply port, the ink discharge port 241C exemplifies the first ink discharge port, and the ink discharge port 241D exemplifies the second ink discharge port.

In the third modification, as for each of the high electric potential wirings 235A1, as having been already explained in the second embodiment, the amount of movement of the electric charge is increased at positions nearer to the right end portion, and the amount of heat generation is increased. On this account, when attention is focused on the influence of the heat generation brought about by the respective high electric potential wirings 235A1, the temperatures of the ink contained in the manifolds 242A1, 242A2 are raised in the direction directed to the right. On the contrary, when attention is focused on the influence of the heat generation brought about by the pressure generator 140, as having been already explained in the second embodiment, the temperatures of the ink contained in the manifolds 242A1, 242A2 are raised in the direction directed to the left. In other words, the temperature gradient, which is caused by the heat generation of the respective high electric potential wirings 235A1, is raised in the direction directed from the left to the right, while the temperature gradient, which is caused by the heat generation of the pressure generator 140, is raised in the direction directed from the right to the left. The temperature gradients are opposite to one another. As a result, the temperature gradients are offset. The temperatures of the ink contained in the manifolds 242A1, 242A2 tend to be constant in the left-right direction.

On the other hand, as for each of the high electric potential wirings 235B1, as having been already explained in the second embodiment, the amount of movement of the electric charge is increased at positions nearer to the left end portion, and the amount of heat generation is increased. On this account, when attention is focused on the influence of the heat generation brought about by the respective high electric potential wirings 235B1, the temperatures of the ink contained in the manifolds 242B1, 242B2 are raised in the direction directed to the left. On the contrary, when attention is focused on the influence of the heat generation brought about by the pressure generator 140, as having been already explained in the second embodiment, the temperatures of the ink contained in the manifolds 242B1, 242B2 are raised in the direction directed to the right. In other words, the temperature gradient, which is caused by the heat generation of the respective high electric potential wirings 235B1, is raised in the direction directed from the right to the left, while the temperature gradient, which is caused by the heat generation of the pressure generator 140, is raised in the direction directed from the left to the right. The temperature gradients are opposite to one another. As a result, the temperature gradients are offset. The temperatures of the ink contained in the manifolds 242B1, 242B2 tend to be constant in the left-right direction.

Further, also in the third modification, the ink discharge ports 241C, 241D are provided in the same manner as the second embodiment. Therefore, it is possible to raise the flow rate of the ink in the manifolds 242A1, 242A2, 242B1, 242B2. Further, even if the ejection amount per unit time from the nozzle 27 is increased, and the flow rate of the ink is lowered in the manifolds 242A1, 242A2, 242B1, 242B2, then the temperature gradient is hardly generated in the entire ink-jet head 211. On this account, the difference is decreased in relation to the size of the ink droplet ejected from the nozzle 27 in the ink-jet head 211.

According to the fact as described above, even in the case of the construction of the third modification, it is possible to obtain the effect which is the same as or equivalent to that of the second embodiment.

[Fourth Modification]

Next, an explanation will be made with reference to FIG. 13 about still another modification (fourth modification) of the second embodiment. The structure of the manifold differs between an ink-jet head 311 of the fourth embodiment and the ink-jet head 211 of the third modification described above. However, the structures of the other components are common to one another. On this account, the structure, which is different from that of the third modification, will be explained below. Any explanation will be omitted about the common structures.

Figure 13:
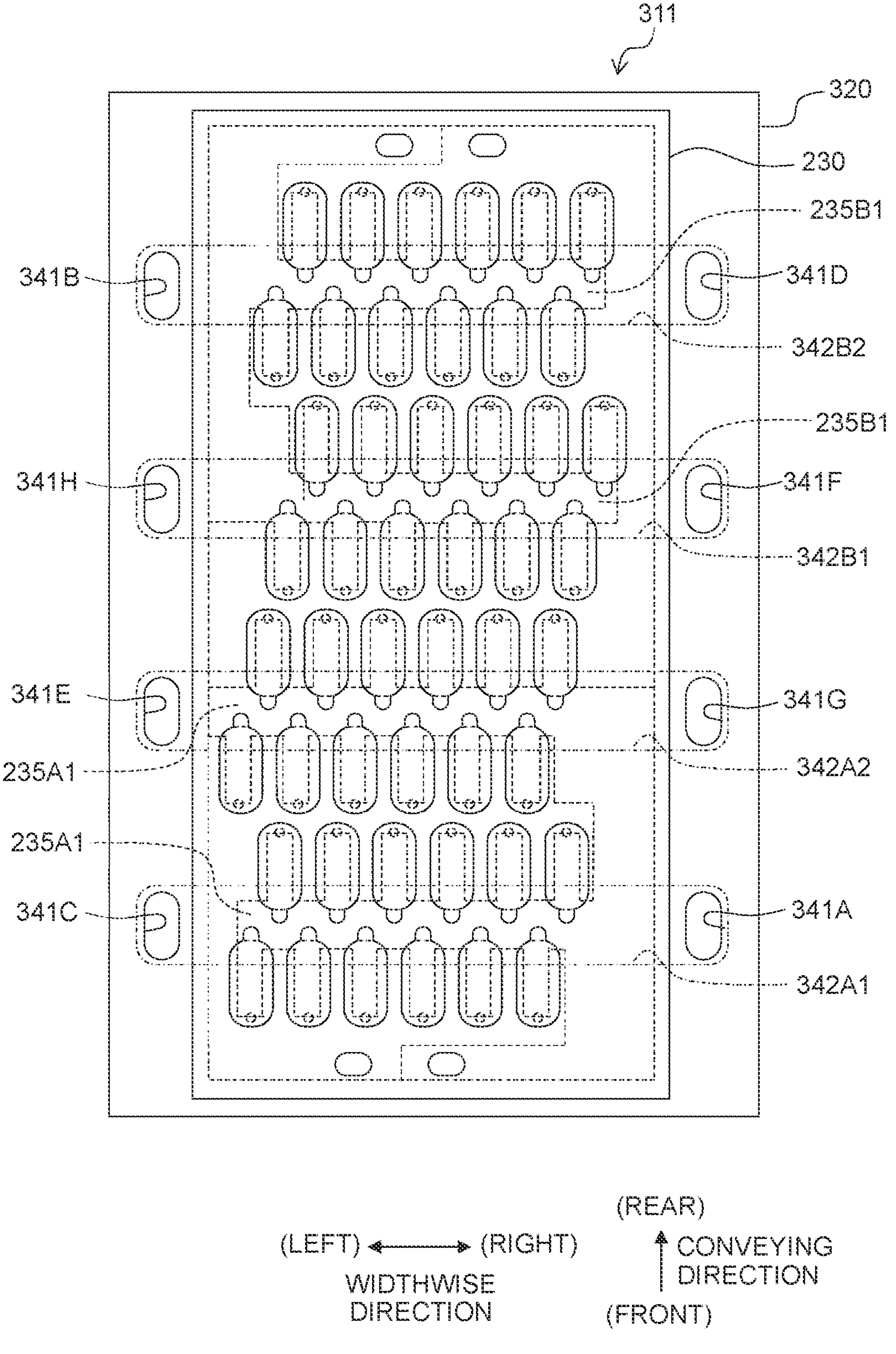
FIG. 13 is a top view illustrative of another modification of the ink-jet head according to the second embodiment.

As depicted in FIG. 13, a flow passage member 320 of the ink-jet head 311 of the fourth modification has four manifolds 342A1, 342A2, 342B1, 342B2 which extend in the left-right direction respectively, four ink supply ports 341A, 341B, 341E, 341F, and four ink discharge ports 341C, 341D, 341G, 341H. The right end and the left end of the manifold 342A1 are communicated with the ink supply port 341A and the ink discharge port 341C respectively. The left end and the right end of the manifold 342A2 are communicated with the ink supply port 341E and the ink discharge port 341G respectively. The right end and the left end of the manifold 342B1 are communicated with the ink supply port 341F and the ink discharge port 341H respectively. The left end and the right end of the manifold 342B2 are communicated with the ink supply port 341B and the ink discharge port 341D respectively.

The ink, which flows from the ink tank 13 via the ink supply port 341A into the manifold 342A1, flows in the leftward direction through the manifold 342A1. Then, the ink, which flows through the manifold 342A1, flows into a plurality of individual flow passages 43 which are communicated with the manifold 342A1. The ink, which does not flow into the plurality of individual flow passages 43, is recovered to the ink tank 13 via the ink discharge port 341C at the left end of the manifold 342A1.

The ink, which flows from the ink tank 13 via the ink supply port 341E into the manifold 342A2, flows in the rightward direction through the manifold 342A2. Then, the ink, which flows through the manifold 342A2, flows into a plurality of individual flow passages 43 which are communicated with the manifold 342A2. The ink, which does not flow into the plurality of individual flow passages 43, is recovered to the ink tank 13 via the ink discharge port 341G at the right end of the manifold 342A2.

The ink, which flows from the ink tank 13 via the ink supply port 341F into the manifold 342B1, flows in the leftward direction through the manifold 342B1. Then, the ink, which flows through the manifold 342B1, flows into a plurality of individual flow passages 43 which are communicated with the manifold 342B1. The ink, which does not flow into the plurality of individual flow passages 43, is recovered to the ink tank 13 via the ink discharge port 341H at the left end of the manifold 342B1.

The ink, which flows from the ink tank 13 via the ink supply port 341B into the manifold 342B2, flows in the rightward direction through the manifold 342B2. Then, the ink, which flows through the manifold 342B2, flows into a plurality of individual flow passages 43 which are communicated with the manifold 342B2. The ink, which does not flow into the plurality of individual flow passages 43, is recovered to the ink tank 13 via the ink discharge port 341D at the right end of the manifold 342B2.

In the fourth modification, the manifold 342A1 exemplifies the first common flow passage, the manifold 342A2 exemplifies the third common flow passage, the manifold 342B1 exemplifies the fourth common flow passage, and the manifold 342B2 exemplifies the second common flow passage.

In the fourth modification, as for each of the high electric potential wirings 235A1, as having been already explained in the second embodiment, the amount of movement of the electric charge is increased at positions nearer to the right end portion, and the amount of heat generation is increased. On this account, when attention is focused on the influence of the heat generation brought about by the respective high electric potential wirings 235A1, the temperatures of the ink contained in the manifolds 342A1, 342A2 are raised in the direction directed to the right. On the other hand, when attention is focused on the influence of the heat generation brought about by the pressure generator 140, as having been already explained in the second embodiment, the temperature of the ink contained in the manifold 342A1 is raised in the direction directed to the left, while the temperature of the ink contained in the manifold 342A2 is raised in the direction directed to the right. In other words, the temperature gradient, which is caused by the heat generation of the respective high electric potential wirings 235A1, is raised in the direction directed from the left to the right. On the contrary, the temperature gradient, which is caused by the heat generation of the pressure generator 140, is raised in the direction directed from the right to the left in relation to the manifold 342A1, and the temperature gradient is raised in the direction directed from the left to the right in relation to the manifold 342A2. As a result, the temperature gradients are offset in the manifold 342A1, and the temperature of the ink contained in the manifold 342A1 tends to be constant in the left-right direction. On the other hand, the temperature gradients are superimposed in the manifold 342A2, and the temperature of the ink contained in the manifold 342A2 is raised in the direction directed to the right.

On the other hand, as for each of the high electric potential wirings 235B1, as having been already explained in the second embodiment, the amount of movement of the electric charge is increased at positions nearer to the left end portion, and the amount of heat generation is increased. On this account, when attention is focused on the influence of the heat generation brought about by the respective high electric potential wirings 235B1, the temperatures of the ink contained in the manifolds 342B1, 342B2 are raised in the direction directed to the left. On the other hand, when attention is focused on the influence of the heat generation brought about by the pressure generator 140, as having been already explained in the second embodiment, the temperature of the ink contained in the manifold 342B1 is raised in the direction directed to the left, while the temperature of the ink contained in the manifold 342B2 is raised in the direction directed to the right. In other words, the temperature gradient, which is caused by the heat generation of the respective high electric potential wirings 235B1, is raised in the direction directed from the right to the left. On the contrary, the temperature gradient, which is caused by the heat generation of the pressure generator 140, is raised in the direction directed from the right to the left in relation to the manifold 342B1, and the temperature gradient is raised in the direction directed from the left to the right in relation to the manifold 342B2. As a result, the temperature gradients are offset in the manifold 342B2, and the temperature of the ink contained in the manifold 342B2 tends to be constant in the left-right direction. On the other hand, the temperature gradients are superimposed in the manifold 342B1, and the temperature of the ink contained in the manifold 342B1 is raised in the direction directed to the left.

In other words, the temperature gradient of the ink contained in the manifold 342A2 is opposite to the temperature gradient of the ink contained in the manifold 342B1. The manifold 342A2 and the manifold 342B1 are adjacent to one another in the front-rear direction. Further, the temperature tends to be constant in the left-right direction in relation to the ink contained in the manifold 342A1 and the ink contained in the manifold 342B2. On this account, it is possible to suppress the uneven density on an image printed by the ink-jet head 311 of the fourth modification.

Further, also in the fourth modification, the ink discharge ports 341C, 341G, 341H, 341D are provided. Therefore, it is possible to raise the flow rate of the ink in the manifolds 342A1, 342A2, 342B1, 342B2. Further, even if the ejection amount per unit time from the nozzle 27 is increased, and the flow rate of the ink is lowered in the manifold 342A1, 342A2, 342B1, 342B2, then the temperature gradient is hardly generated in the entire ink-jet head 311. On this account, the difference is decreased in relation to the size of the ink droplet ejected from the nozzle 27 in the ink-jet head 311.

According to the fact as described above, even in the case of the construction of the fourth modification, it is possible to obtain the effect which is the same as or equivalent to that of the second embodiment.

[Other Modifications]

Figure 14:
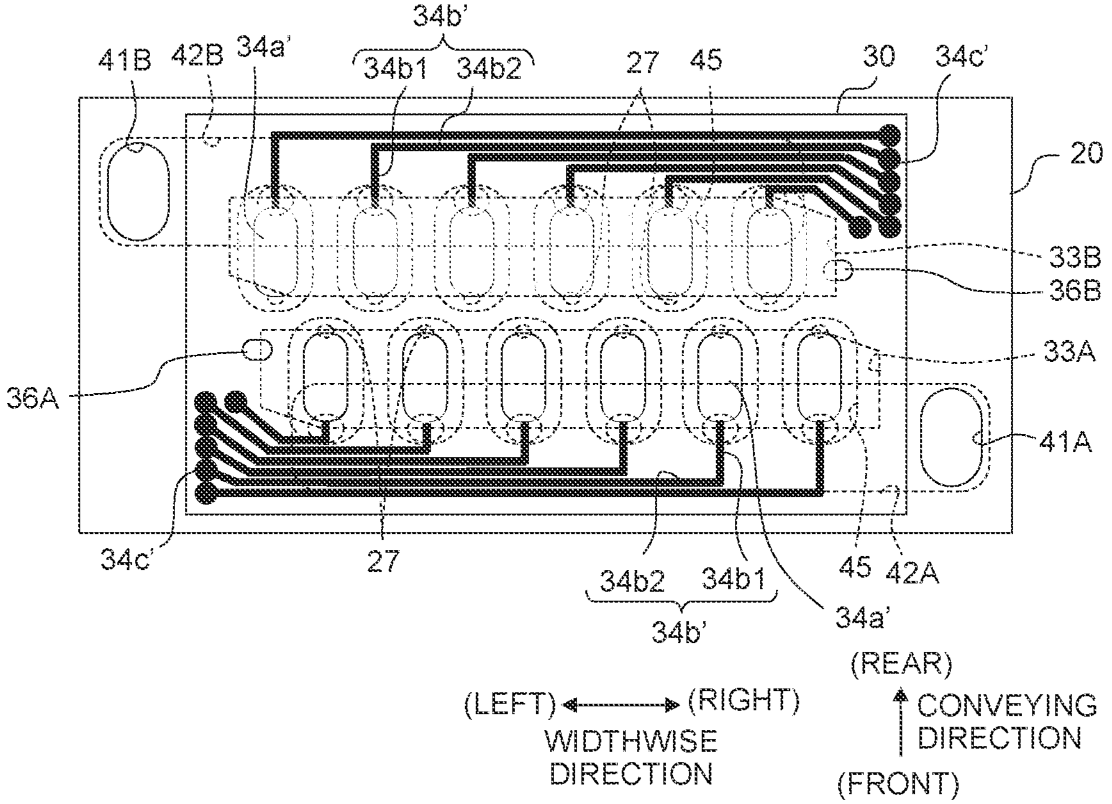
FIG. 14 is a top view illustrative of a modification of the individual electrode of the ink-jet head.

In the case of the actuator member 30 of the first embodiment, the respective individual electrodes 34 are positioned on the upper surface of the piezoelectric layer 32. In addition, each of the individual electrodes 34 is composed of the main portion 34*a* and the protruding portion 34*b*, and the contact with the FPC is positioned at the protruding portion 34*b*. However, there is no limitation thereto. For example, as depicted in FIG. 14, individual wirings 34*b*' may extend from front ends or rear ends of respective individual electrodes 34*a*', and contacts 34*c*' with the FPC may be positioned at end portions of the individual wirings 34*b*' positioned on the side opposite to the individual electrodes 34*a*'. Specifically, the respective individual electrodes 34*a*' and the respective individual wirings 34*b*' are positioned on the upper surface of the piezoelectric layer 32. The individual wiring 34*b*', which extends from each of the individual electrodes 34*a*' positioned on the front side, is composed of a lead portion 34*b*1 which is drawn frontwardly from the front end of the individual electrode 34*a*', and an extending portion 34*b*2 which extends leftwardly from the front end of the lead portion 34*b*1. Then, the contact 34*c*' with the FPC is positioned at the left end portion of the extending portion 34*b*2. On the other hand, the individual wiring 34*b*', which extends from each of the individual electrodes 34*a*' positioned on the rear side, is composed of a lead portion 34*b*1 which is drawn rearwardly from the rear end of the individual electrode 34*a*', and an extending portion 34*b*2 which extends rightwardly from the rear end of the lead portion 34*b*1. Then, the contact 34*c*' with the FPC is positioned at the right end portion of the extending portion 34*b*2.

In this modification, the six individual wirings 34*b*', which extend from the six individual electrodes 34*a*' positioned on the front side respectively, exemplify the first conductive part. The six individual wirings 34*b*', which extend from the six individual electrodes 34*a*' positioned on the rear side respectively, exemplify the second conductive part.

According to the construction of this modification, the ink supply port 41A is positioned on the right side with respect to the six individual flow passages 43A. The ink, which flows into the manifold 42A from the ink supply port 41A, flows through the manifold 42A in the direction directed from the right to the left. On this account, the ink contained in the manifold 42A is affected by the heat generation caused by the piezoelectric element as the ink advances leftwardly, and the temperature is raised. Further, the six individual wirings 34*b*' are concentrated in the area positioned leftwardly from the six individual electrodes 34*a*' positioned on the front side on the piezoelectric layer 32. On this account, the amount of heat generation is increased in the area. As a result, the temperature of the ink contained in the manifold 42A positioned on the front side is more raised as the ink advances leftwardly on account of the influence of the heat generation caused by the six individual wirings 34*b*'.

On the other hand, the ink supply port 41B is positioned on the left side with respect to the six individual flow passages 43B. The ink, which flows into the manifold 42B from the ink supply port 41B, flows through the manifold 42B in the direction directed from the left to the right. On this account, the ink contained in the manifold 42B is affected by the heat generation caused by the piezoelectric element as the ink advances rightwardly, and the temperature is raised. Further, the six individual wirings 34*b*' are concentrated in the area positioned rightwardly from the six individual electrodes 34*a*' positioned on the rear side on the piezoelectric layer 32. On this account, the amount of heat generation is increased in the area. As a result, the temperature of the ink contained in the manifold 42B positioned on the rear side is more raised as the ink advances rightwardly on account of the influence of the heat generation caused by the six individual wirings 34*b*'.

In other words, the temperature gradient in the left-right direction of the ink contained in the manifold 42A is opposite to the temperature gradient in the left-right direction of the ink contained in the manifold 42B. As a result, it is possible to obtain the effect which is the same as or equivalent to that obtained in the first embodiment.

Figure 15:
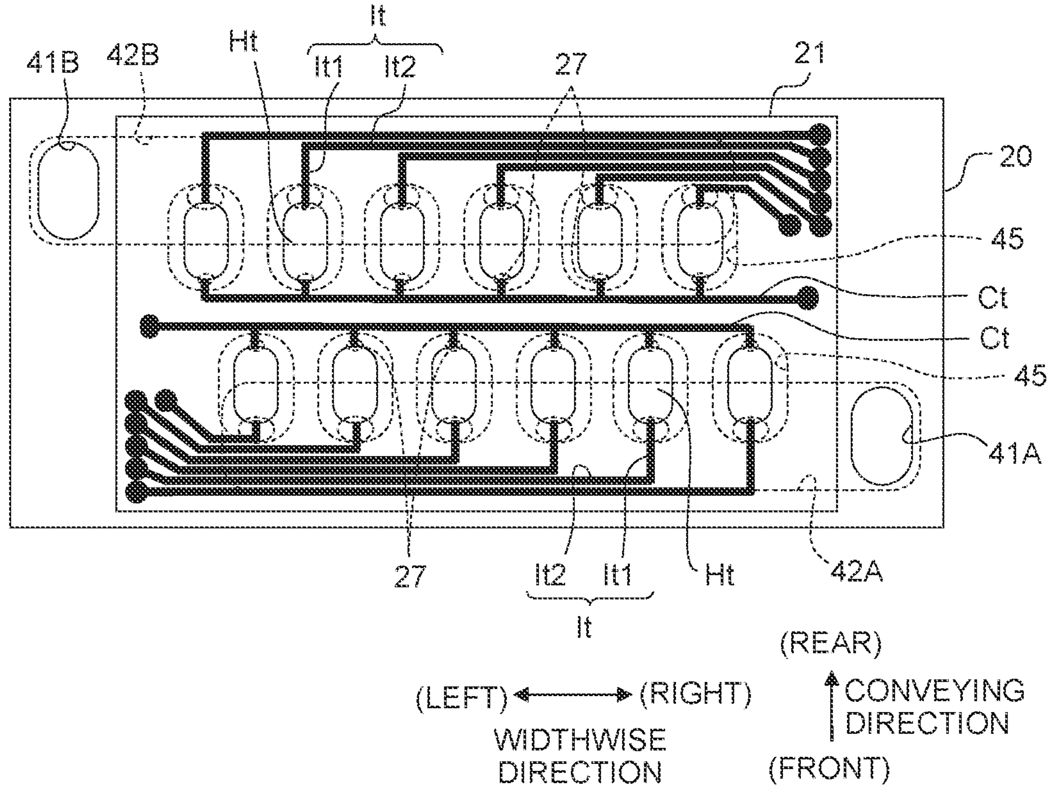
FIG. 15 is a top view illustrative of another modification of the ink-jet head based on the use of a heater as a pressure generator.

Further, in the first embodiment and the second embodiment as well as in the modifications thereof, the actuator member 30 has the plurality of piezoelectric elements. However, there is no limitation thereto. For example, as depicted in FIG. 15, twelve heaters Ht may be positioned on the upper surface of the ink sealing film 21. The twelve heaters Ht are positioned in a zigzag form in the left-right direction so that the twelve heaters Ht are opposed to the twelve pressure chambers 45 in the up-down direction respectively. Further, twelve individual wirings It and two common wirings Ct are positioned on the upper surface of the ink sealing film 21. The twelve individual wirings It are connected to the twelve heaters Ht respectively. On the other hand, one common wiring Ct is commonly connected to the six heaters Ht positioned on the front side, and the other common wiring Ct is commonly connected to the six heaters Ht positioned on the rear side.

The individual wiring It, which is connected to each of the heaters Ht positioned on the front side, is composed of a lead portion It1 which is drawn frontwardly from the front end of the heater Ht, and an extending portion It2 which extends leftwardly from the front end of the lead portion It1. Then, the left end of the extending portion It2 is electrically connected to the FPC. In relation thereto, the common wiring Ct, which extends in the left-right direction, is connected to the rear ends of all of the heaters Ht positioned on the front side via lead portions extending rearwardly. The left end of the common wiring Ct is electrically connected to the FPC. On the other hand, the individual wiring It, which is connected to each of the heaters Ht positioned on the rear side, is composed of a lead portion It1 which is drawn rearwardly from the rear end of the heater Ht, and an extending portion It2 which extends rightwardly from the rear end of the lead portion It1. Then, the right end of the extending portion It2 is electrically connected to the FPC. In relation thereto, the common wiring Ct, which extends in the left-right direction, is connected to the front ends of all of the heaters Ht positioned on the rear side via lead portions extending frontwardly. The right end of the common wiring Ct is electrically connected to the FPC.

Then, the respective heaters Ht are connected to a heater power source via the common wiring Ct, and the respective heaters Ht are connected to a driving circuit of the FPC via the individual wirings It. The driving signal is applied from the driving circuit via the individual wiring It, and thus the heater Ht, which is connected to the individual wiring It, generates the heat. Accordingly, the ink, which is contained in the pressure chamber 45 opposed to the heater Ht subjected to the heat generation, is heated, and bubbles are formed. Then, in accordance with the pressure thereof, the ink droplets are ejected from the nozzle 27 communicated with the pressure chamber 45.

According to the construction of this modification, the ink supply port 41A is positioned on the right side with respect to the six heaters Ht positioned on the front side. The ink, which flows into the manifold 42A from the ink supply port 41A, flows in the direction directed from the right to the left through the manifold 42A. On this account, the ink contained in the manifold 42A is affected by the heat generation caused by the heater Ht as the ink advances to the left, and the temperature is raised. Further, the six individual wirings It, which are connected to the six heaters Ht positioned on the front side, are concentrated in the area positioned leftwardly with respect to the six heaters Ht positioned on the front side on the upper surface of the ink sealing film 21. Further, the left end portion of the common wiring Ct commonly connected to the six heaters Ht positioned on the front side are also positioned in the area positioned leftwardly from the six heaters Ht positioned on the front side. On this account, the amount of heat generation is increased in the area. As a result, as for the ink contained in the manifold 42A positioned on the front side, the temperature is more raised as the ink advances leftwardly on account of the influence of the heat generation caused by the common wiring Ct and the six individual wirings It.

On the other hand, the ink supply port 41B is positioned on the left side with respect to the six heaters Ht. The ink, which flows into the manifold 42B from the ink supply port 41B, flows in the direction directed from the left to the right through the manifold 42B. On this account, the ink contained in the manifold 42B is affected by the heat generation caused by the heater Ht as the ink advances to the right, and the temperature is raised. Further, the six individual wirings It, which are connected to the six heaters Ht positioned on the rear side, are concentrated in the area positioned rightwardly with respect to the six heaters Ht positioned on the rear side on the upper surface of the ink sealing film 21. Further, the right end portion of the common wiring Ct commonly connected to the six heaters Ht positioned on the rear side are also positioned in the area positioned rightwardly from the six heaters Ht positioned on the rear side. On this account, the amount of heat generation is increased in the area. As a result, as for the ink contained in the manifold 42B positioned on the rear side, the temperature is more raised as the ink advances rightwardly on account of the influence of the heat generation caused by the common wiring Ct and the plurality of individual wirings It.

In other words, the temperature gradient in the left-right direction of the ink contained in the manifold 42A is opposite to the temperature gradient in the left-right direction of the ink contained in the manifold 42B. As a result, it is possible to obtain the effect which is the same as or equivalent to that of the first embodiment.

The embodiments and the modifications of the present teaching have been explained above. However, the present teaching is not limited thereto, for which it is possible to variously change the design within a scope defined in claims.

In the embodiments and the modifications described above, the printer 1 performs the printing on the medium M in accordance with the so-called line head system in which the ink is ejected from the line head 10 which is long in the widthwise direction and which is fixed with respect to the printer 1. However, the printer 1 may perform the printing on the medium M in accordance with the so-called the serial head system in which the ink-jet head 11 is moved in the sheet widthwise direction by means of a carriage.

In the embodiments and the modifications described above, the exemplary cases have been explained, in which the present teaching is applied to the ink-jet head for ejecting the ink from the nozzle. However, there is no limitation thereto. The present teaching can be also applied to any liquid ejecting apparatus other than the ink-jet head for ejecting any liquid other than the ink from the nozzle.

What is claimed is:

1. An ink-jet head comprising:

a flow passage member including: a first common flow passage extending in a first direction; a first ink supply port communicated with the first common flow passage; a plurality of first individual flow passages each connected to the first common flow passage and aligned in the first direction; a second common flow passage extending in the first direction and positioned to be deviated from the first common flow passage in a second direction orthogonal to the first direction; a second ink supply port communicated with the second common flow passage; and a plurality of second individual flow passages each connected to the second common flow passage and aligned in the first direction;

a plurality of first pressure generators aligned in the first direction and configured to generate pressure to ink contained in the first individual flow passages;

a plurality of second pressure generators aligned in the first direction and configured to generate pressure to the ink contained in the second individual flow passages;

a first conductive part configured to be electrically connected to the first pressure generators and a control circuit; and a second conductive part configured to be electrically connected to the second pressure generators and the control circuit;

wherein the first ink supply port is positioned on one side in the first direction with respect to the first individual flow passages and the ink is supplied to the first common flow passage only from the first ink supply port, and the second ink supply port is positioned on the other side in the first direction with respect to the second individual flow passages and the ink is supplied to the second common flow passage only from the second ink supply port, and an end portion of the first conductive part positioned nearer to the control circuit is positioned on the one side in the first direction with respect to the first pressure generators and an end portion of the second conductive part positioned nearer to the control circuit is positioned on the other side in the first direction with respect to the second pressure generators, or the end portion of the first conductive part positioned nearer to the control circuit is positioned on the other side in the first direction with respect to the first pressure generators and the end portion of the second conductive part positioned nearer to the control circuit is positioned on the one side in the first direction with respect to the second pressure generators.

2. The ink-jet head according to claim 1, wherein the end portion of the first conductive part positioned nearer to the control circuit is positioned on the one side in the first direction with respect to the first pressure generators, and the end portion of the second conductive part positioned nearer to the control circuit is positioned on the other side in the first direction with respect to the second pressure generators.

3. The ink-jet head according to claim 1, wherein the end portion of the first conductive part positioned nearer to the control circuit is positioned on the other side in the first direction with respect to the first pressure generators, and the end portion of the second conductive part positioned nearer to the control circuit is positioned on the one side in the first direction with respect to the second pressure generators.

4. The ink-jet head according to claim 1, wherein the first pressure generators comprise:

a plurality of first individual electrodes;

a plurality of first low electric potential electrodes; and a plurality of first high electric potential electrodes positioned between the first individual electrodes and the first low electric potential electrodes in a third direction orthogonal to the first direction and the second direction, the second pressure generators comprise:

a plurality of second individual electrodes;

a plurality of second low electric potential electrodes; and a plurality of second high electric potential electrodes positioned between the second individual electrodes and the second low electric potential electrodes in the third direction, the first conductive part is a first high electric potential wiring electrically connected to the first high electric potential electrodes, and the second conductive part is a second high electric potential wiring electrically connected to the second high electric potential electrodes.

5. The ink-jet head according to claim 1, wherein the first pressure generators comprise a plurality of first individual electrodes and a plurality of first constant electric potential electrodes, the second pressure generators comprise a plurality of second individual electrodes and a plurality of second constant electric potential electrodes, the first conductive part is composed of a plurality of first individual wirings electrically connected to the first individual electrodes respectively, and the second conductive part is composed of a plurality of second individual wirings electrically connected to the second individual electrodes respectively.

6. The ink-jet head according to claim 1, wherein the first pressure generators comprise a plurality of first individual electrodes and a first constant electric potential electrode, the second pressure generators comprise a plurality of second individual electrodes and a second constant electric potential electrode, the first conductive part is the first constant electric potential electrode, and the second conductive part is the second constant electric potential electrode.

7. The ink-jet head according to claim 1, further comprising:

a plurality of third pressure generators aligned in the first direction;

a plurality of fourth pressure generators aligned in the first direction;

a third conductive part configured to be electrically connected to the third pressure generators and the control circuit; and a fourth conductive part configured to be electrically connected to the fourth pressure generators and the control circuit, wherein the flow passage member further comprises a plurality of third individual flow passages aligned in the first direction and a plurality of fourth individual flow passages aligned in the first direction, the third individual flow passages and the fourth individual flow passages are positioned between the first individual flow passages and the second individual flow passages in the second direction, the third pressure generators are configured to generate pressure to the ink contained in the third individual flow passages, and the fourth pressure generators are configured to generate pressure to the ink contained in the fourth individual flow passages.

8. The ink-jet head according to claim 7, wherein an end portion of the third conductive part positioned nearer to the control circuit is positioned on the one side in the first direction with respect to the third pressure generators, and an end portion of the fourth conductive part positioned nearer to the control circuit is positioned on the other side in the first direction with respect to the fourth pressure generators.

9. The ink-jet head according to claim 1, wherein the flow passage member further comprises: a third common flow passage extending in the first direction; a plurality of third individual flow passages each connected to the third common flow passage and aligned in the first direction; a fourth common flow passage extending in the first direction; and a plurality of fourth individual flow passages each connected to the fourth common flow passage and aligned in the first direction, the third individual flow passages and the fourth individual flow passages are positioned between the first individual flow passages and the second individual flow passages in the second direction, and the third common flow passage and the fourth common flow passage are positioned between the first common flow passage and the second common flow passage in the second direction.

10. The ink-jet head according to claim 9, wherein the third common flow passage is communicated with the first ink supply port, and the fourth common flow passage is communicated with the second ink supply port.

11. An ink-jet printer comprising:

the ink-jet head as defined in claim 1; and an ink supply unit configured to supply the ink to the ink-jet head, wherein the first ink supply port and the second ink supply port are communicated with the ink supply unit.

12. The ink-jet printer according to claim 11, wherein the flow passage member further comprises a first ink discharge port communicated with the first common flow passage and a second ink discharge port communicated with the second common flow passage, the first ink discharge port and the second ink discharge port are communicated with the ink supply unit, and the first ink discharge port is positioned on the other side in the first direction with respect to the first individual flow passages and the second ink discharge port is positioned on the one side in the first direction with respect to the second individual flow passages.

* * * * *